(12) United States Patent
Manandise et al.

(10) Patent No.: US 11,544,468 B2
(45) Date of Patent: Jan. 3, 2023

(54) DOCUMENT TEXT EXTRACTION TO FIELD-SPECIFIC COMPUTER EXECUTABLE OPERATIONS

(71) Applicant: Intuit Inc., Mountain View, CA (US)

(72) Inventors: Esmé Manandise, Tallahassee, FL (US); Karpaga Ganesh Patchirajan, Frisco, TX (US); Saikat Mukherjee, Fremont, CA (US)

(73) Assignee: Intuit Inc., Mountain View, CA (US)

(*) Notice: Subject to any disclaimer, the term of this patent is extended or adjusted under 35 U.S.C. 154(b) by 182 days.

(21) Appl. No.: 16/938,385

(22) Filed: Jul. 24, 2020

(65) Prior Publication Data

US 2022/0027564 A1   Jan. 27, 2022

(51) Int. Cl.
*G06F 40/30* (2020.01)
*G06F 40/289* (2020.01)
*G06F 40/253* (2020.01)
*G06F 40/211* (2020.01)

(52) U.S. Cl.
CPC ............ *G06F 40/30* (2020.01); *G06F 40/211* (2020.01); *G06F 40/253* (2020.01); *G06F 40/289* (2020.01)

(58) Field of Classification Search
CPC .............................. G06Q 10/10; G06Q 40/123
See application file for complete search history.

(56) References Cited

U.S. PATENT DOCUMENTS

| | | | | |
|---|---|---|---|---|
| 11,238,240 | B2* | 2/2022 | Hunter | G06N 3/0445 |
| 2004/0243556 | A1* | 12/2004 | Ferrucci | G06F 16/319 |
| 2016/0188564 | A1* | 6/2016 | Lobez Comeras | G06F 40/211 704/9 |
| 2018/0032497 | A1* | 2/2018 | Mukherjee | G06V 30/416 |
| 2018/0260474 | A1* | 9/2018 | Surdeanu | G06F 40/279 |
| 2021/0056263 | A1* | 2/2021 | Xia | G06F 40/40 |

OTHER PUBLICATIONS

Thorin, Dan. "A multilingual semantic dependency parser for text of legislation in the domain of Value Added Tax". Master Thesis, Lund University, Nov. 2008, pp. 1-49 (Year: 2008).*

* cited by examiner

*Primary Examiner* — Jesse S Pullias

(74) *Attorney, Agent, or Firm* — Paradice and Li LLP

(57) ABSTRACT

This disclosure describes converting computer-executable predicate-argument structures for a specific field to field-specific predicated-argument structures to improve execution. In some implementations, a method can be performed by one or more processors of a computing device, and can include receiving one or more predicate-argument structures (PASs) associated with taxation-specific text and converting the one or more PASs into one or more tax-specific predicate-argument structures (TPASs). Converting the one or more PASs to one or more TPASs may include one or more of: defining terms in a segment based on a definition of the term from a different segment or line description (including from a different document); reordering nodes, replacing nodes, or removing nodes of a segment (such as based on one or more single segment tree traversal rules); or combining multiple PASs for multiple segments of a single line description based on one or more multiple segment tree traversal rules.

15 Claims, 13 Drawing Sheets

200

```
"agricultural program payment": [
  [
    "F4835::3a",
    "Agricultural program payments (see instructions).",
    "True"
  ],
  [
    "F1040ScheduleF::4a",
    "Agricultural program payments (see instructions).",
    "True"
  ],
  [
    "F1040ScheduleF::39a",
    "Agricultural program payments (see instructions).",
    "True"
  ],
```

200

```
"agricultural program payment": [
  [
    "F4835::3a",
    "Agricultural program payments (see instructions).",
    "True"
  ],
  [
    "F1040ScheduleF::4a",
    "Agricultural program payments (see instructions).",
    "True"
  ],
  [
    "F1040ScheduleF::39a",
    "Agricultural program payments (see instructions).",
    "True"
  ]
],
```

FIG. 2

DOCUMENT TEXT EXTRACTION TO FIELD-SPECIFIC COMPUTER EXECUTABLE OPERATIONS

TECHNICAL FIELD

This disclosure relates generally to text extraction and conversion, and specifically to converting natural language text in documents to field-specific computer-executable operations for a computer.

DESCRIPTION OF RELATED ART

Some computer system applications require a large collection of texts (collated from documents) to be converted to computer-readable operations. In some examples, a large number of written manuals for preparing wedding invitations (or other documents), for drawing specific design art, for constructing grammatically correct sentences, for translating between specific spoken languages, for playing different games (such as Chess or Go), or other tasks that may be performed by a computer provide valuable instructions on how to perform such tasks, but the instructions are written in a natural language as spoken between people. For example, financial management programs, such as tax preparation software, require a plurality of financial documents to be translated into computer-executable operations in order to process financial documents (such as a tax return).

Typically, such documents (whether singular or a collection) are required to be reviewed manually by a human expert (such as a computer programmer experienced with tax preparation for tax preparation software), and the expert manually generates computer-executable instructions based on the written input. In this manner, one or more people review each document in order to code a program to be current with all such documents. A plethora of documents may be continuously updated or added, but the computer is statically programmed (such as a program previously programmed) based on the previous documents reviewed. For example, the United States Internal Revenue Service may update documents for tax returns every year. Additionally, new documents may be repeatedly added. The updates and additions require constant manual reviews by the experts, and the static program is required to be partially torn down and recoded by the experts to account for such updates. Accordingly, there is a need for an automated system to ingest and convert text for a plurality of documents to computer-executable operations.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for converting computer-executable predicate-argument structures associated with taxation-specific documents to computer-executable tax-specific predicate-argument structures. In some implementations, the method can be performed by one or more processors of a computing device, and can include receiving one or more predicate-argument structures (PASs) associated with taxation-specific text and converting the one or more PASs into one or more tax-specific predicate-argument structures (TPASs). Converting the one or more PASs to one or more TPASs may include one or more of: defining terms in a segment based on a definition of the term from a different segment or line description (including from a different document); reordering nodes, replacing nodes, or removing nodes of a segment (such as based on one or more single segment tree traversal rules); or combining multiple PASs for multiple segments of a single line description based on one or more multiple segment tree traversal rules.

Another innovative aspect of the subject matter described in this disclosure can be implemented in a system. The system can include at least one or more processors and a memory. The memory may store instructions that, when executed by the one or more processors, causes the system to perform a number of operations. In some implementations, the number of operations includes receiving one or more PASs associated with taxation-specific text and converting the one or more PASs into one or more TPASs. Converting the one or more PASs to one or more TPASs may include one or more of: defining terms in a segment based on a definition of the term from a different segment or line description (including from a different document); reordering nodes, replacing nodes, or removing nodes of a segment (such as based on one or more single segment tree traversal rules); or combining multiple PASs for multiple segments of a single line description based on one or more multiple segment tree traversal rules.

Another innovative aspect of the subject matter described in this disclosure can be implemented in a non-transitory computer-readable medium. The non-transitory computer-readable medium may store instructions that, when executed by one or more processors of an apparatus, cause the apparatus to perform operations including receiving one or more PASs associated with taxation-specific text and converting the one or more PASs into one or more TPASs. Converting the one or more PASs to one or more TPASs may include one or more of: defining terms in a segment based on a definition of the term from a different segment or line description (including from a different document); reordering nodes, replacing nodes, or removing nodes of a segment (such as based on one or more single segment tree traversal rules); or combining multiple PASs for multiple segments of a single line description based on one or more multiple segment tree traversal rules.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

The example implementations are illustrated by way of example and are not intended to be limited by the figures of the accompanying drawings. Like numbers reference like elements throughout the drawings and specification.

FIG. 2 shows a portion of an example label mapping that may be used in converting one or more predicate-argument structures to one or more tax-specific predicate-argument structures.

DETAILED DESCRIPTION

Figure 1:
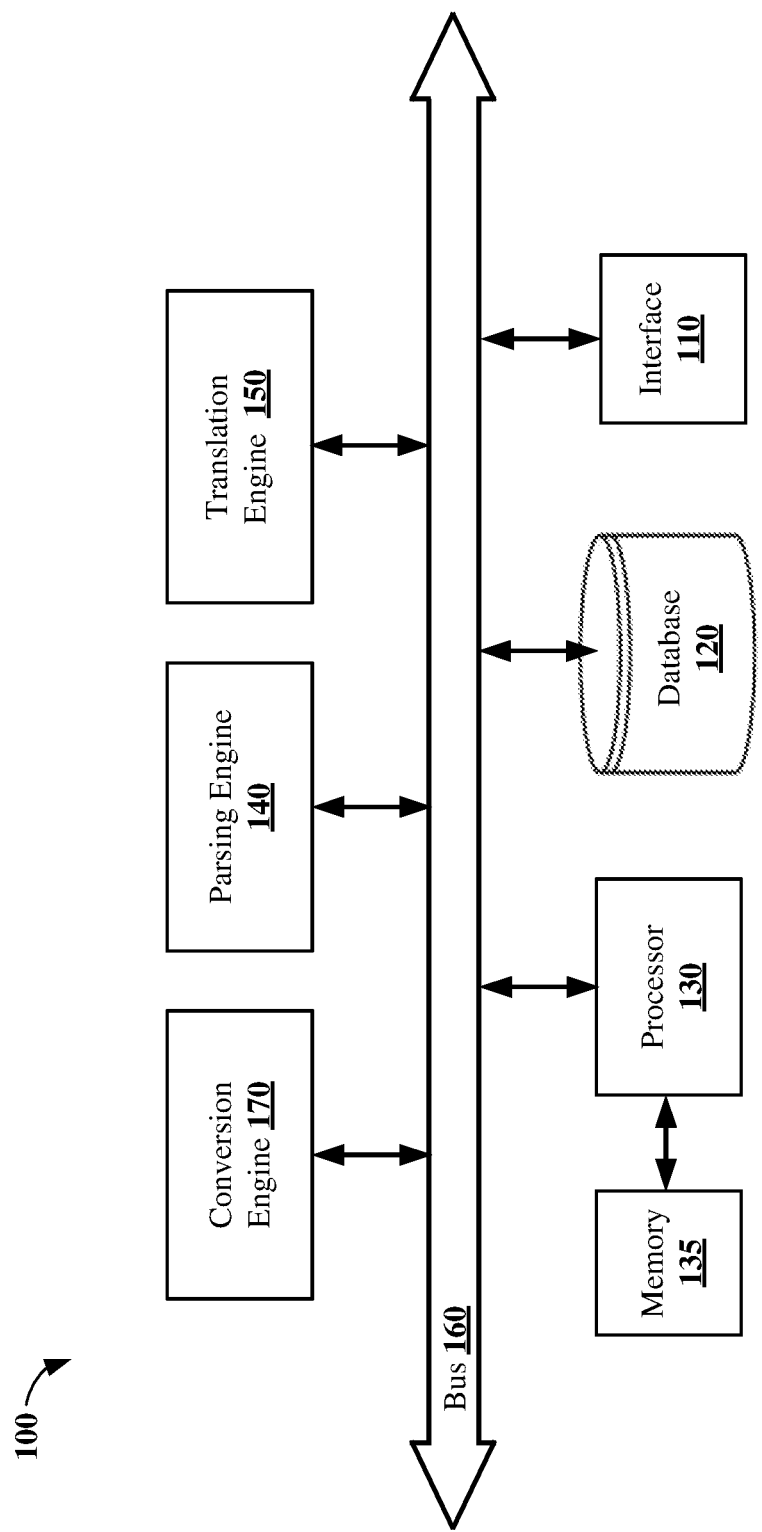
FIG. 1 shows an example computing system to convert text in one or more documents to computer-executable operations for a program.

Implementations of the subject matter described in this disclosure may be used to convert text in a natural language form within one or more documents into one or more computer-executable operations for a program. For example, all of the text from a plurality of up-to-date taxation-specific documents need to be reviewed in order to code or provide inputs to a tax preparation program for preparing tax returns. Additionally, such taxation-specific documents continuously change and more documents are added as taxation laws or guidance changes over time. To further complicate the matter, different portions of the text in the documents are written by different people with different writing styles. For example, active or passive voice may be used, commands or a narrative may be used, third person or first person voice may be used, different ordering of phrases may be used, and so on. In this manner, multiple sentences having the same meaning may be written in a completely different way so as not to resemble one another in terms of the sentence construct. Therefore, a robust, automated system for converting text in documents to computer-executable operations is needed.

Previous efforts to automatically convert natural language text to computer-readable operations, such as described in U.S. Pat. No. 10,579,721 entitled "Lean parsing: a natural language processing system and method for parsing domain-specific languages," and issued Mar. 3, 2020 and U.S. patent application Ser. No. 16/795,443 entitled "Financial Document Text Conversion to Computer-readable Operations," and filed Feb. 19, 2020 (which are both assigned to the Assignee of the present application), include dividing language in a single document into segments. Each segment is then processed to attempt to generate a computer-readable operation in a predicate-argument structure (PAS), which is described in the above referenced patent and patent application. In this manner, a document's text is automatically converted to computer-readable operations as PASs without an expert reviewing the document and manually coding such operations.

The previous efforts analyze a segment without reference to any other segments. For example, if each segment is a sentence of natural language text in a document, a sentence is converted to a PAS without reference to any other sentences in the document. In this manner, each segment is also converted to a PAS without reference to any other documents. However, some segments may refer to other segments or other documents. For example, a segment in a tax form may refer to a worksheet or another document to calculate a specific value for the form (such as a 1040 tax return form referring to a W-2 document to identify an adjusted gross income (AGI) value). Processing a segment without reference to other segments in the document or in other documents may prevent properly identifying a predicate or one or more arguments in a segment. For example, a term defined in another segment or document may remain unidentified for the segment in generating a PAS.

In addition, previous efforts to analyze a segment is based on lexica of generally acceptable definitions of terms or phrases. However, some terminology may have specific meanings for a specific field of documents. For example, a meaning of a specific term or phrase in tax documents may differ from the term or phrase as used in everyday language. Processing documents without reference to specific meanings (especially when processing a segment without reference to other segments) may cause an incorrect identification of an operation or a variable. Furthermore, operations or calculations may have specific characteristics when in documents of a specific field (such as taxation-related documents), and the characteristics may allow simplification of the PASs to more easily executed operations. However, processing a segment without reference to other segments and without identifying the field of documents to which the segment belongs (such as tax-related documents) prevents recognizing the characteristics and converting PASs into simpler computer-executable operations.

Therefore, what is needed is a computer-implemented method to convert PASs to field-specific PASs. As used herein, a PAS (including a field-specific PAS) refers to the one or more computer-executable operations generated by the computing system for one or more segments of text. Field-specific PASs may be generated (i) from one PAS or multiple PASs, (ii) with reference to other segments or PASs, and/or (iii) with reference to the field of use in which the PASs exist (such as being tax-related). In the present disclosure, converting one or more PASs to a tax-specific PAS (TPAS) is described. TPASs correspond to text from taxation-based documents (such as tax returns, tax forms, tax instructions, income forms, government benefit forms (such as Social Security), and so on). A corpus of taxation-based documents may be directed to a specific region or taxation authority, such as national, state, city, province, and so on, for some implementations. In some aspects, meanings of terms may vary between taxation authorities or districts, and some of the rules or constructs of TPAS may be specific for the specific authority or district. However, the corpus for a field-specific PAS may be any suitable delineation from other types of PAS. While the concepts are shown with reference to a tax document field of use, the concepts may be applied to other fields of use, and the specific field of use in the examples are provided for clarity in explaining aspects of the present disclosure and not to limit the scope of the present disclosure. In addition, example portions of text for segmentation described herein are line descriptions in a tax document. For example, a tax document may include many lines to be entered or to provide information in generating a tax return. Each line may include a line description describing the line. Such line description may be segmented and used to generate one or more PASs, which may then be converted to one or more TPASs. However, any suitable portion of text may be used for segmentation or generations of PASs or TPASs (or other field-specific PASs), and the present disclosure is not limited to the use of line descriptions provided in some examples.

Various implementations of the subject matter disclosed herein provide one or more technical solutions to the technical problem of converting complex PASs to simpler field-dependent PASs (such as TPASs) for execution. More specifically, various aspects of the present disclosure provide a unique computing solution to a unique computing problem that did not exist prior to previous efforts to automatically generate PASs for computer execution, such as for tax preparation software to facilitate automated preparation of tax return documents. As such, implementations of the subject matter disclosed herein are not an abstract idea such as organizing human activity or a mental process that can be performed in the human mind.

FIG. 1 shows an example computing system 100 configured to convert text in one or more documents to computer-executable operations for a financial management program. The system 100 is shown to include an interface 110, a database 120, one or more data processors 130, a memory 135 coupled to the data processors 130, a parsing engine 140, and a translation engine 150. In some implementations, the various components of the system 100 may be interconnected by at least a data bus 160, as depicted in the example of FIG. 1. In other implementations, the various components of the system 100 may be interconnected using other suitable signal routing resources.

The system 100 may be configured to convert document text to one or more PASs and convert the one or more PASs to one or more TPASs. In this manner, the interface 110 may include one or more output devices, input devices, or other suitable elements that allow financial documents or text to be ingested by the system 100 or to output information from the system 100. In some implementations, electronic financial documents (such as a pdf document, an xml document, a tiff document, and so on) may be provided to the computing system 100 via the interface 110 (such as a serial interface or a parallel interface external to the computing system 100).

For example, the computing system 100 is configured to receive one or more pdfs (such as via the interface 110) and extract text from the pdfs to structured content. The structured content is in a JavaScript Object Notation (JSON) format. For example, the text is broken into arrays of key-value pairs with terms or phrases of the text being labeled with field names.

In some other implementations, the text from financial documents may be provided to the computing system 100 via the interface 110. The text may include computer formatted text (which may be generated during ingestion of documents by another computing system), image captures of text, or another suitable format for text. For example, the JSON formatted structured content (from the above example) may be generated by a different computing system and received by the computing system 100 via the interface 110. A portion of the JSON-formatted structured content is converted to one or more PASs (such as by engines 140 and 150), and the one or more PASs are converted to one or more TPASs (such as by conversion engine 170). In some other implementations, the computing system 100 is configured to receive and convert existing PASs to one or more TPASs. In this manner, the interface 110 may be configured to receive one or more PASs for conversion to one or more TPASs by the system 100. Any suitable format of text information may be received, though, and the interface 110 is not limited to the above examples.

Converting text in taxation-based documents to PASs or TPASs may be rule-based. In this manner, pre-defined rules are used to automatically convert the text (such as in a JSON structured content) to PASs or convert the PASs to TPASs. The database 120 may store the plurality of rules used for conversion. If the system 100 is configured to convert text to PASs, the rules include relationship rules for parsing text. Relationship rules may include rules mapping prepositions, appositions, or other text modifiers to transforms for the base noun of the modifier. Relationship rules may also include rules mapping relationships between phrases. For example, if text is divided into segments, and the segment "If yes, enter line 23; otherwise, enter line 24," is to be processed, the relationship rules may include one or more rules to determine that "otherwise" in the text (such as based on punctuation and the meaning of 'otherwise') causes the second portion of the segment to be dependent on the first portion of the segment for "if" and "then" operations. As noted, relationship rules may also include punctuation rules (such as regarding commas, periods, and so on) and character formatting rules (such as capitalization) defining segmentation of phrases, sentences, or other units of text as well as defining relationships between phrases and terms. The punctuation and character-formatting rules may also be used to indicate formal nouns and other special terms in a segment. Relationship rules may include other grammar rules, such as for conjunctions, verb tense, and so on, that are used to define relationships between neighboring terms in a text segment. Relationship rules may also include rules defining specific terms modifying or having a relationship with one or more neighboring terms (such as line, box, or form having a relationship with a subsequent term defining which line, box, or form). Such relationship rules may be defined in a grammar look-up table or other structure (referred to herein as a grammar dictionary) in the database 120. The grammar dictionary may be updated as needed to account for changes in use of language (such as stylistic changes) in financial documents. In some implementations, the grammar dictionary is configured to be specific to the field of use for the PASs (such as for TPASs).

If the system is to convert text to PASs, the database 120 may also store one or more lexica. A lexicon may associate similar terms with one another (such as synonyms), associate different tenses or versions of a term with the root term, associate specific verbs or nouns with executable calculations (such as add, subtract, remove, difference, summation, minimum, and so on), and associate nouns with variables for an executable calculation (such as "line" occurring after the verb "subtract"). In this manner, a lexicon may be used for lemmatization of terms, associating terms with one another with reference to an executable calculation, or to determine ordering of terms for an executable calculation. A lexicon may also be updated as needed to account for changes in terms or use of terms in financial documents. In some implementations, the database 120 stores a lexicon for unigrams and a lexicon for n-grams. In this manner, a first set of rules may be associated with a specific word in the unigram lexicon, and a second set of rules may be associated with a specific phrase (including multiple words) in the n-gram lexicon. As a result, a word in the unigram lexicon that is within a phrase in the n-gram lexicon may cause the system 100 to perform the first set of rules and the second set of rules.

The database 120 may further store well-formedness rules for determining when text has been sufficiently processed to convert and output one or more PASs. In some implementations, the well-formedness rules may indicate relationships of terms with reference to an executable calculation for the system 100 to determine whether all variables are identified for the executable calculation in order to convert to a PAS. Other constraints may also be defined in the well-formedness rules to allow text to be converted to a PAS without requiring complete parsing of a segment text.

The database 120 may also store the PASs generated using the described methods. In some other implementations, the database 120 may store the PASs generated by another computing system. In this manner, the system 100 (such as the conversion engine 170) may convert the stored PASs to one or more TPASs for execution. The database 120 may further store instructions that may be executed for the computing system 100 in converting text to PASs or in converting PASs to TPASs.

The data processors 130, which may be used for general data processing operations (such as manipulating the rules stored in the database 120, executing the instructions stored in the database 120, and so on), may be one or more suitable processors capable of executing scripts or instructions of one or more software programs stored in the system 100 (such as within the memory 135 or the database 120). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other configuration).

The memory 135 may be any suitable memory to store any number of software programs, executable instructions, machine code, algorithms, and the like that can be executed by the data processors 130 to perform one or more corresponding operations or functions. For example, the memory 135 may store one or more data structures to persist parsing and translation of text when processing to generate the mathematical operations. In some examples, the memory may be a persistent memory (such as non-volatile memory). In some implementations, hardwired circuitry may be used in place of, or in combination with, software instructions to implement aspects of the disclosure. As such, implementations of the subject matter disclosed herein are not limited to any specific combination of hardware circuitry and/or software.

The parsing engine 140 may be used to parse text from financial documents in generating one or more PASs. For example, the parsing engine 140 parses text from a JSON structure of the text from one or more taxation-specific documents. In some implementation, the parsing engine 140 segments text into one or more segments. For example, the parsing engine 140 identifies punctuation in the text and divides the text into sentence size segments based on the punctuation. In some further implementations, the parsing engine 140 may tokenize text in a segment. For example, the parsing engine 140 converts the text in a segment to one or more n-grams. In some aspects, the parsing engine 140 converts the segment's text into unigrams (with each term or word in the segment being converted to a unigram). In some aspects, the parsing engine 140 may use a lexicon to replace a unigram with a synonym. For example, the parsing engine 140 may identify a unigram "reduce" in a segment as a synonym for "subtract," and "subtract" may be a key term in a unigram lexicon (such as a term associated with an operation to be performed). The parsing engine 140 replaces the term "reduce" with "subtract." In some other aspects, the parsing engine 140 may use the lexicon to determine a root word for a term. For example, the parsing engine 140 may lemmatize one or more unigrams or stem one or more unigrams in the segment. In a specific example, the parsing engine 140 may identify that a unigram "subtracting" in a segment has a root word of "subtract." The parsing engine 140 may replace the unigram "subtracting" with "subtract" during lemmatization. In this manner, the parsing engine 140 may process the segment to include unigrams of terms in their root form (which may be a word for lemmatization or not a word for stemming). In combining the two examples, the parsing engine 140 may convert "reducing" to "reduce" (root form) to "subtract" (synonym). In this manner, "reducing" may be associated with a subtraction operation to be coded in a PAS.

In some implementations, the parsing engine 140 may use an n-gram lexicon (where n is greater than one) to identify an n-gram in addition to using a unigram lexicon to identify a unigram. In this manner, if text is divided into unigrams, consecutive unigrams may be analyzed together using the n-gram lexicon (such as to find a match associated with a predicate (such as a verb corresponding to an operation) or an argument (such as a noun corresponding to variable)). For example, a specific term within a phrase may be lemmatized based on the unigram lexicon, and the phrase (including the lemmatized term) may be associated with a specific executable calculation based on the n-gram lexicon. As used herein, though, parsing or analyzing using an n-gram lexicon may refer to one or both of a unigram lexicon or an n-gram lexicon where n is greater than one. In addition, an n-gram may refer to when n equals one (unigram) or is greater than one unless stated otherwise. For example, analyzing an n-gram may refer to analyzing a unigram, analyzing a plurality of unigrams, or a combination of both.

The parsing engine 140 may use one or more relationship rules to (i) determine one or more executable calculations existing in a text segment (such as identifying the term "subtract", "subtraction", "subtracted", "subtracting", "minus", "reduce", "decrease", or any other root based variants or synonyms in the segment or a phrase including the term), (ii) associate terms in the segment with an executable calculation (identify that a "sub(variable1, variable2)" operation is to be coded), and (iii) determine translation information regarding relationships between the associated terms for the executable calculation (such as associating terms with variables or an operator of the executable calculation).

As used herein, an executable calculation (such as a PAS) may be one or more calculations or operations to be embodied in computer-readable form for execution by one or more processors during execution of a program. Example executable calculations may include arithmetic operations (such as addition, subtraction, division, multiplication, increment, decrement, and so on), analytical or statistical operations (such as limit, minimum, maximum, median, mean, standard deviation, variance, and so on), associative operations (such as enter, replace, switch, and so on), and conditional operations (such as when, if/then/else, and so on). A TPAS may be one or more calculations or operations based on one or more PASs and embodied in computer-readable form for execution by one or more processors during execution of a taxation-based program (such as tax preparation software).

The parsing engine 140 may also bracket n-grams together to identify associations between terms. For example, the parsing engine 140 may identify a comma in a sentence segment, and the parsing engine may bracket together the unigrams after the comma to indicate an association between the unigrams apart from the remainder of the segment. In another example, the parsing engine 140 may identify a sequence of unigrams in the segment existing in an n-gram lexicon, and the parsing engine may bracket together the unigrams to indicate an association based on the n-gram lexicon. As used herein, bracketing is indicating an association between n-grams in any suitable manner. For example, the segment may be stored in a data structure of computer-readable text, and the parsing engine 140 may enter a parenthesis, bracket, or so on that is understood by the computing system 100 to group a plurality of n-grams as associated with one another. In another example, a data structure may include a field for each n-gram. The data structure may also include control information. The control information may be updated to indicate an association between n-grams during bracketing. Parenthesis or other characters entered or control information of the data structure may be included in translation information of a data structure for translating the segment.

The parsing engine 140 may also reorder n-grams (such as to change tense or syntax to a common tense or syntax). For example, for a segment stored in a data structure including fields of n-grams, the fields may be rearranged or the control information may be updated to indicate a new sequence of the fields for the segment. In another example, a data structure may have the n-grams rearranged by character reordering in the segment to indicate the new ordering of n-grams.

The parsing engine 140 may further perform frame binding. Frame binding herein refers to using defined relationships between n-grams to determine how to bracket and construct (such as reorder) the segment for translation. Frame binding may also refer to using defined relationships to determine and indicate relationships between frames or segment portions. Frame binding may include rules regarding distance of nouns from verbs, ordering of terms, sentence hierarchy (such as if part of a prepositional phrase), modifiers of apposition terms, punctuation and character formatting, and so on to bracket terms together or otherwise structure the segment or bind multiple frames. For example, for the segment phrase "reduce line 24 by line 23," the parsing engine 140 may determine "reduce" is a verb associated with executable calculation sub( ) for subtract. The parsing engine 140 may therefore determine that at least two nouns subsequent to "reduce" are associated with the executable calculation (since sub( ) includes at least two variables). The parsing engine 140 may thus determine that "line 24" and "line 23" are two nouns closest and subsequent to the verb and are thus associated with the executable calculation. The parsing engine 140 may also use rules regarding prepositions to determine which is a first variable and which is a second variable of the executable calculation. For example, the parsing engine 140 uses a rule regarding "by" associated with the executable calculation for subtraction to determine that line 24 is the first variable and line 23 is the second variable (with sub(variable1,variable2)=variable 1−variable 2). In this manner, the parsing engine 140 identifies a relationship between the n-grams, and may bracket the neighboring n-grams to be associated with "reduce." In the above example, the parsing engine 140 may parse "reduce line 24 by line 23" as "(reduce(line 24, by line 23))." If the parsing engine 140 does not fully parse the text portion associated with the executable calculation during a pass through the segment, the parsing engine 140 may include any remaining associated n-grams in a third field (such as after ", by line 23" in the above parsing example). In this manner, the parsing engine 140 is not required to completely parse a segment before attempting to translate the segment.

The data structure storing a segment may be stored in any suitable memory (such as memory 135 or database 120). In this manner, the parsing engine 140 may access the memory to access the data structure and store any changes to the segment in the data structure. Any suitable data structure may be used to indicate the segment, changes to the segment (such as reordering, lemmatization, and so on) and any determined relationships between n-grams in the segment (such as bracketing, identifying executable calculations, and so on). Translation information used by the translation engine 150 to translate the segment may include the determined relationship information (such as between n-grams in a segment or across segments).

The translation engine 150 may be used to translate the parsed segment into one or more well-formed formal expressions (such as based on well-formedness rules) that are coded into one or more computer-executable operations (such as for a PAS). The computer-executable operations are formatted in a formal computer language with a defined structure and syntax (that is translated into or exists in binary for execution by the computing system 100). The computer language is defined with one or more lexica and grammar (similar to a natural, spoken language, such as English). In some implementations, the translation engine 150 generates the formal expressions in a pseudo-first-order predicate logic format for the PASs. In using a pseudo-first-order predicate logic format for the computer language, the computing system 100 may identify relationships between neighboring phrases, determine a hierarchy of the operations to be perform, and bracket and order the n-grams to indicate such hierarchy for the PASs. The rules that are met for parsing may indicate relationships between brackets of n-grams or other translation information stored in the data structure including the parsed segment, and the translation engine 150 uses the translation information, translation rules, and well-formedness rules to generate the one or more operations (PASs) in a pseudo-first-order predicate logic format.

Referring back to the example of the parsed phrase "(reduce(line 24, by line 23))," the parsing engine 140 may replace "reduce" with the "sub( )" operator to generate "(sub(line 24, by line 23))." Such phrase may be stored in the data structure for the segment, and the translation engine 150 accesses the data structure and translates the phrase. Relationship rules may indicate that the unigram "line" is associated with the subsequent number, and the translation engine 150 may therefore update the phrase "(sub(line 24, by line 23))" to "(sub(line(24), by line(23)))," wherein "line( )" is a keyword in the computer language (such as for a memory location or specific variable in the program). The relationship rules may also indicate that the unigram "by" is extraneous, and the translation engine 150 removes the unigram to generate "(sub(line(24), line(23)))." The translated phrase may meet well-formedness rules for the subtraction operation. If no other n-grams in the segment are ambiguous regarding well-formedness rules (such as another bracket of n-grams not conforming for an executable calculation), the translation engine 150 may generate the PAS "sub(line(24), line(23))" (stripping the outside brackets as extraneous).

The examples of text and structures (such as PASs and TPASs) are illustrated in a human-readable format for clarity in explaining aspects of the present disclosure. However, the structures may be stored and processed in machine-readable code that is not easily read by humans (such as in binary format or hexadecimal format specific to the computer language). For example, a variable in the examples may indicate a memory sector storing a value for processing in the PAS. A parenthesis in the examples may indicate a linking to one or more variables or a grouping of one or more variables stored in multiple sectors of memory (such as based on pointers or other means of identifying memory sectors). Other punctuation may indicate delineation between memory sectors.

In addition, PASs (and TPASs) may be stored so as to be associated with a tree structure. For example, a predicate may be stored as a root node associated with one or more child nodes, and each child node may be associated with one or more additional child nodes. Example PASs and TPASs (including rules for processing and organization) are illustrated as human-readable tree structure diagrams for clarity in describing aspects of the present disclosure (such as techniques in converting one or more PASs to a TPAS). However, the PASs and TPASs are stored and executed in a machine-readable format, and the examples are provided as non-limiting examples to explain aspects of the disclosure.

In some implementations, if the system 100 does not convert text to PAS (such as another system providing PASs to the computing system 100 via the interface 110), the system 100 may not include the parsing engine 140 and the translation engine 150. As such, the system 100 uses the conversion engine 170 to convert pre-existing PASs to one or more TPASs for execution for a taxation-based program.

The conversion engine 170 may be used to convert one or more PASs (such as those generated by the system 100 or received by a different system) to field-specific PASs (such as one or more TPASs for a taxation-based application). In converting one or more PASs to one or more TPASs, the conversion engine 170 bases the conversion on any interdependencies between portions of a segment or between segments (which may exist in the same document or across multiple documents). In some implementations, the database 120 stores a mapping of terms or phrases to indicate the location of the term or phrase in one or more documents. Such as mapping is referred to herein as a label mapping.

As noted above, JSON structured content of the text includes labels for the text. The labels include a location of a portion of text in one document or in multiple documents. For example, for United States taxation documents (including schedules and forms for a 1040 tax return with the Internal Revenue Service (IRS)), the phrase "agricultural program payment" appears in text associated with field 3a of Form 4835, field 4a of Schedule F of a 1040 form, and field 39a of Schedule F of the 1040 form. The label mapping includes an array or matrix of labels for each term or phrase to be referenced in constructing one or more TPASs. The mapping thus indicates the locations of the phrase in one or more documents. The mapping may also indicate whether each instance of the term is a used reference or a defined reference. A defined reference is an instance of the term in a location of text that defines the term. For example, a defined reference for "agricultural program payment" may exist in a segment of the instructions for Schedule F provided by the IRS. A used reference is an instance of the term in text, but the instance cannot be used to define the term. For example, a used reference is not associated with an operation to calculate a value for the term and is not associated with a segment defining the term.

FIG. 2 shows a portion of an example label mapping 200 that may be used in converting one or more PASs to one or more TPASs. The portion of the mapping 200 illustrates an array for "agricultural program payment" (with reference to the above example). The array may be included with a plurality of arrays for different terms and phrases (which may exist before or after the illustrated array in the label mapping 200). The array shows three references for the phrase "agricultural program payment." Each reference is bracketed and separated from one another in the array. Each reference includes the label indicating the location of the reference (such as "F4835::3a" to indicate field 3a of form 4835, "F1040ScheduleF::4a" to indicate field 4a of Schedule F of form 1040, and "F1040ScheduleF::39a" to indicate field 39a of Schedule F of form 1040). Each reference also includes the text segment including the phrase (such as "Agricultural program payments (see instructions)." in the provided example). In some implementations, each reference also includes a flag to indicate the validity of the existence of the term at the location (such as set the "True" term in each reference). As shown, each reference may be a plain old java object (POJO) built for the label mapping 200. While not shown, the array may also indicate if any of the references are defined references for the term (such as via a flag or ordering of references in the array).

In some implementations, the computing system 100 receives a label mapping from another system (such as via interface 100). In some other implementations, the computing system 100 generates the label mapping from the received JSON formatted texts for one or more documents. In addition, the system 100 may update the label mapping as more formatted text is received or generated from new or updated documents.

Figure 3:
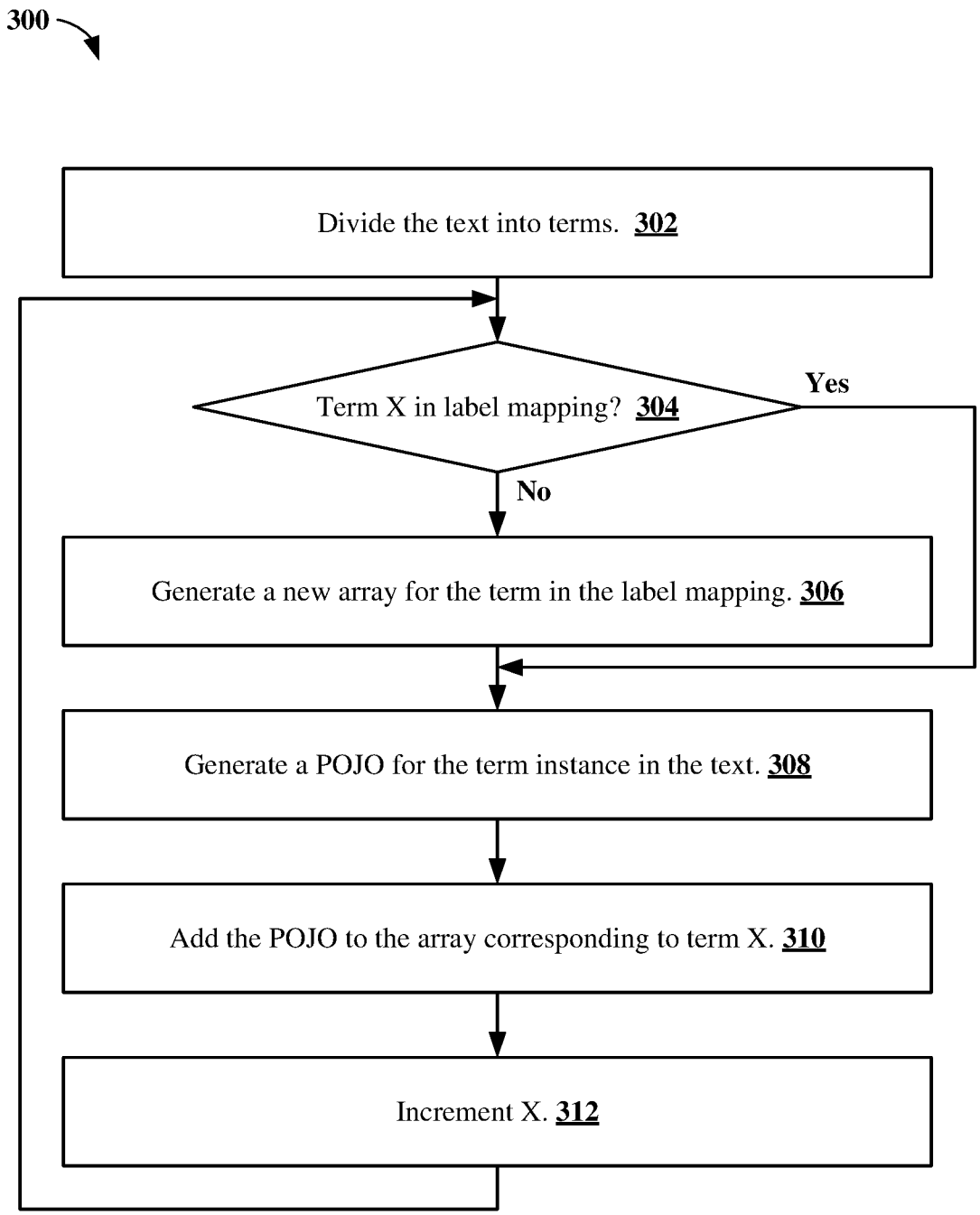
FIG. 3 shows an illustrative flow chart depicting an example operation for generating or updating a label mapping.

FIG. 3 shows an illustrative flow chart depicting an example operation 300 for generating or updating a label mapping from text. As noted above, the text may be in JSON. The example operation 300 may be performed by the computing system 100 (such as the conversion engine 170) or any other suitable computing system. At 302, the computing system 100 divides the text into terms. As used for these examples, a term may refer to a unigram or n-gram phrase (such as described above regarding lemmatization).

The system 100 determines if each term in the text is in the label mapping. For example, for the first iteration of the decision block 304, the system 100 determines if the first term (term X=1) includes an array in the label mapping. In some implementations, the system 100 uses a lexicon or otherwise determines if the term is similar to another term in the label mapping in order to find a match. If the term does not include an array in the label mapping, the system 100 generates a new array for the term in the label mapping (306). If the term includes an array in the label mapping, operation 300 proceeds to block 308. At block 308, the system 100 generates a POJO for the term instance in the text (such as an object including the variables of the label/location, the segment or segment portion including the text, and a flag indicating the existence of the term at the location). The POJO may be similar to as illustrated in FIG.

2. At 310, the system 100 adds the POJO to the array corresponding to term X. X is then incremented (312), and the example operation 300 reverts to decision block 304. Operation 300 continues until each term of the text is processed. Operation 300 may be across multiple documents (such as a corpus of taxation-specific documents), and the resulting label mapping maps references to locations in multiple documents (such as illustrated in the example mapping 200).

In some implementations, the system 100 also determines if the specific reference is included in a segment with an operation defining the term. If so, the reference may be marked or otherwise flagged in the array as a defined reference. In this manner, the system 100 may find a defined reference for a specific term and use the defined reference (such as a PAS generated for the term using the segment including the defined reference) to define the term at other instances in the text (such as from a different place in the document or in a different document). As such, a term is not required to be defined in the same segment or a neighboring segment in which the term appears. Since the label mapping corresponds to a corpus of field-specific documents (such as tax-related documents for a specific authority, such as the IRS or Canada Revenue Agency (CRA)), the definitions of terms should be consistent across all text in the corpus. For example, "agricultural program payment" (as illustrated in mapping 200) has the same meaning across all US-specific taxation documents. As noted above, the label mapping may be stored in the database 120. Therefore, the engine 170 (such as the processors 130 executing software to perform the operations of engine 170) may access and edit data stored in the database 120 to generate and update the label mapping. With the label mapping generated and stored, the conversion engine 170 is configured to use the label mapping and other rules (which may be stored in the database 120 or the memory 135) to convert one or more PASs to one or more TPASs (described in more detail below).

The engines 140, 150, and 170 may be implemented in hardware, software, or a combination of both. If at least a portion is implemented in software, the software may be executed by the processors 130 and stored in the memory 135 or the database 120. In some other implementations, the engines 140, 150, and 170 may be implemented separate from the processors 130 (such as if implemented in hardware or executed by a different processor no illustrated). As noted above, if the system 100 is to receive PASs via interface 110, the system 100 may not include engines 140 and 150 that would be used to convert text (such as JSON structured content) to PASs. However, the particular architecture of the computing system 100 shown in FIG. 1 is but one example of a variety of different architectures within which aspects of the present disclosure may be implemented. For example, in other implementations, the system 100 may not include a parsing engine 140, the functions of which may be implemented by the processors 130 executing corresponding instructions or scripts stored in the memory 135. Similarly, the functions of the translation engine 150 or the conversion engine 170 may be performed by the processors 130 executing corresponding instructions or scripts stored in the memory 135. Thus, while the examples herein are described with reference to the computing system 100, any suitable architecture may be used to perform the described methods. For example, while the engines 140, 150 and 170, interface 110, and processors 130 are illustrated as being coupled to one another via a common bus 160, any of the components 110-150 and 170 may be directly connected to one another via dedicated links. In another example, the computing system 100 may include additional or fewer components than shown.

The computing system 100 (or another suitable system) ingests and processes document text into one or more PASs. Such generation of PASs includes robust natural language processing to convert natural language text to computer-executable operations. In generating PASs, a PAS is attempted to be generated for each segment. For example, if a document includes 20 segments, the computing system 100 attempts to generate 20 PASs (one for each segment). As noted above, a PAS includes structuring of operations to indicate relationships between different portions of an operation or between operations. However, the PASs may include undefined terms or may be in an inefficient form for execution by the computing system 100. Conversion of one or more PASs to one or more TPASs (such as by the conversion engine 170) allows the system 100 to define undefined terms and/or restructure the operations into a more efficient form.

Figure 4:
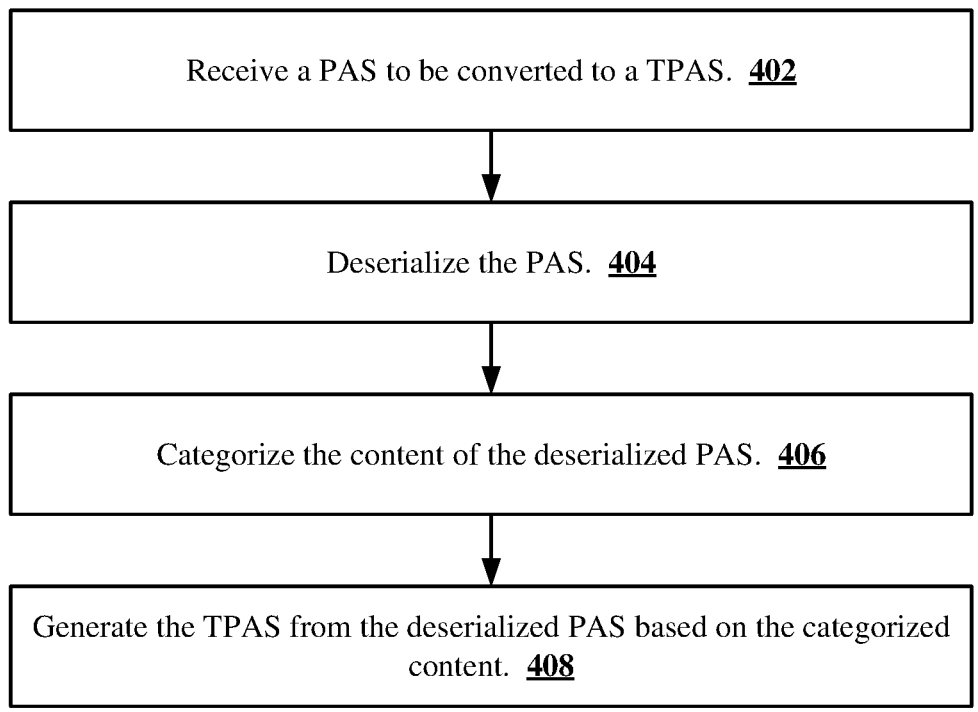
FIG. 4 shows an illustrative flow chart depicting an example operation for converting one or more predicate-argument structures into a tax-specific predicate-argument structure.

FIG. 4 shows an illustrative flow chart depicting an example operation 400 for converting one or more PASs to a TPAS. At 402, the computing system 100 receives a PAS to convert to a TPAS. For example, the computing system 100 generates the PAS from a tax document's text. In another example, the computing system 100 receives the PAS via the interface 110 from another computing system.

At 404, the computing system 100 deserializes the PAS. A PAS is a string of predicates and arguments for one or more operations to be performed by the system 100. A complex object may be in an inefficient form as a result of the serialization of the object into the PAS. For example, segment (1) below is an example segment of text that is converted to a PAS:

> Both spouses were under 65, but only one spouse retired on permanent and total disability      (1)

The PAS (I) for segment (1) is shown below:

> PAS: and(lt(age(spouse(both)), 65), retire(spouse (one), permanent_disability))      (I)

"and" is a Boolean AND or accumulation arithmetic operation, "lt" is a less than arithmetic operation, "age" is a data-entry operation (non-arithmetic) regarding the age of the taxpayer or spouse, "retire" is a data-entry operation (non-arithmetic) indicating whether the taxpayer and/or the spouse are retired from employment, and "spouse" is a data-entry operation indicating whether a calculation or rule applies to both the taxpayer and spouse or only one of them.

Figure 5:
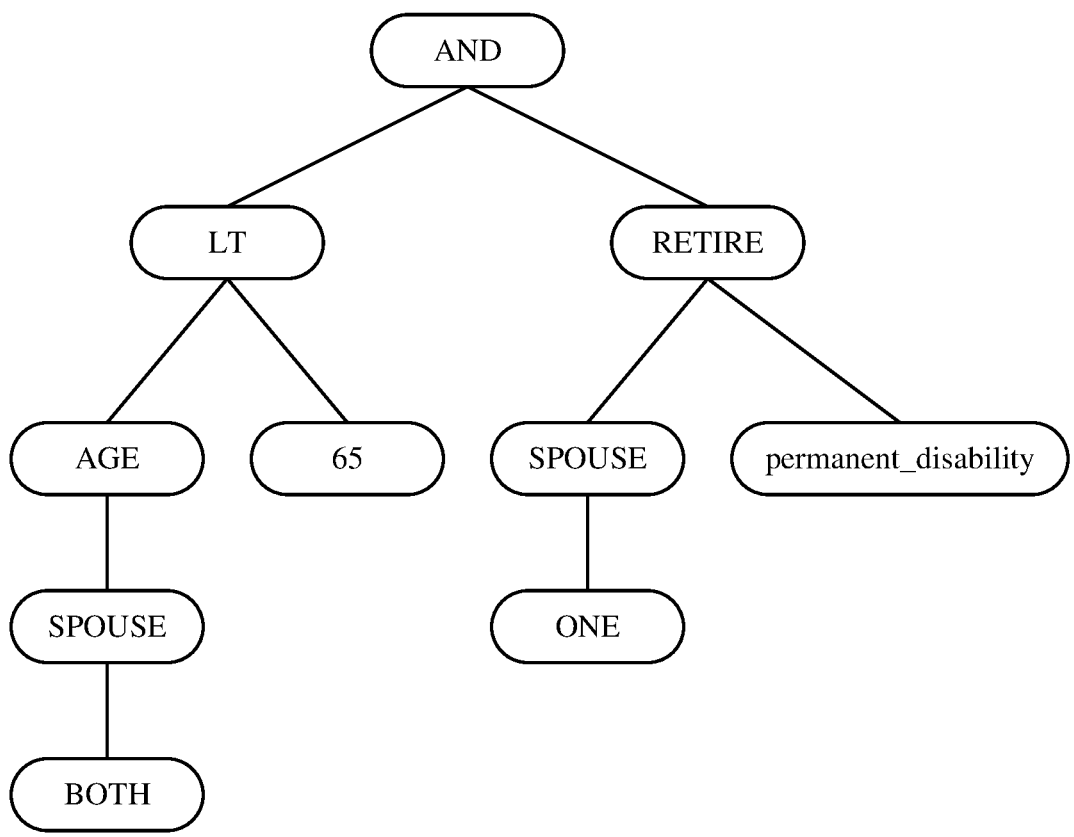
FIG. 5 shows an example tree structure of a predicate-argument structure illustrating the bundling of predicates and arguments in serialized form.

FIG. 5 shows a tree structure 500 of the PAS (I) for segment (1). The tree structure 500 illustrates the bundling of predicates and arguments in the serialized form of the PAS (I). For example, each parenthesis in the PAS (I) indicates a different node, and the nesting of parenthesis and variables indicates child nodes to parent nodes. Object "and" is the root node as corresponding to the outer most parenthesis in PAS (I). As shown, nodes "lt" and "retire" (which are objects in parenthesis of the "and" object in PAS (I)) are child nodes to parent node "and." Further nesting in PAS (I) are illustrated as further child nodes in the tree structure 500, with the entirety of PAS (I) illustrated in the tree structure 500. In PAS (I), the "spouse" node may require the lt operation to be performed multiple times, but such is not indicated until reaching a grandchild node of the lt operation. Therefore, a computing system 100 attempting to execute the PAS (I) may inefficiently perform multiple passes through PAS (I) to execute all of the lt operations required by the PAS (I) in its illustrated form.

Deserialization includes breaking down the serialized string of nodes into a non-serialized structure of nodes for reorganization for a TPAS. For example, the computing system 100 may break the PAS (such as illustrated as including a plurality of nodes in the tree structure 500) into a plurality of separate objects and their relationships to one another (whether a child or parent to another node). As illustrated in tree structure 500, each object in the PAS is a node in the tree structure. As used herein, a tree structure may also be referred to as a dependency graph.

Referring back to operation 400 in FIG. 4, the system 100 categorizes the content of the deserialized PAS (406). For example, a node may be categorized as an arithmetic operator or a non-arithmetic operator (such as based on a defined list of arithmetic operations stored in the system 100, such as in database 120). In another example, categorizing the content may include defining an undefined object in the PAS. For example, a node in a dependency graph may be undefined based on processing a segment without reference to other segments. Defining the object may include using the label mapping to determine a definition for the object. Example implementations of defining an object are described in more detail below.

Referring back to FIG. 4, the computing system 100 generates the TPAS from the deserialized PAS based on the categorized content (408). For example, how to restructure the dependency graph 500 (FIG. 5) for TPAS is based on the existence (or non-existence) of one or more arithmetic operations (determined during categorization), and the computing system 100 may serialize the restructured dependency graph into the TPAS. In another example, a node may be defined as a type of token from a PAS that is not needed for a TPAS, and the node may be removed when converting the PAS to the TPAS. Restructuring the dependency graph refers to reordering or reorganizing objects in the PAS so that predicates or arguments may occur in a different order than as serialized in the PAS (or one or more objects may be removed from the PAS). As such, a TPAS may include a different order of predicates or arguments and/or fewer number of objects than a corresponding PAS. Restructuring a dependency graph is also described in more detail below.

Figure 6:
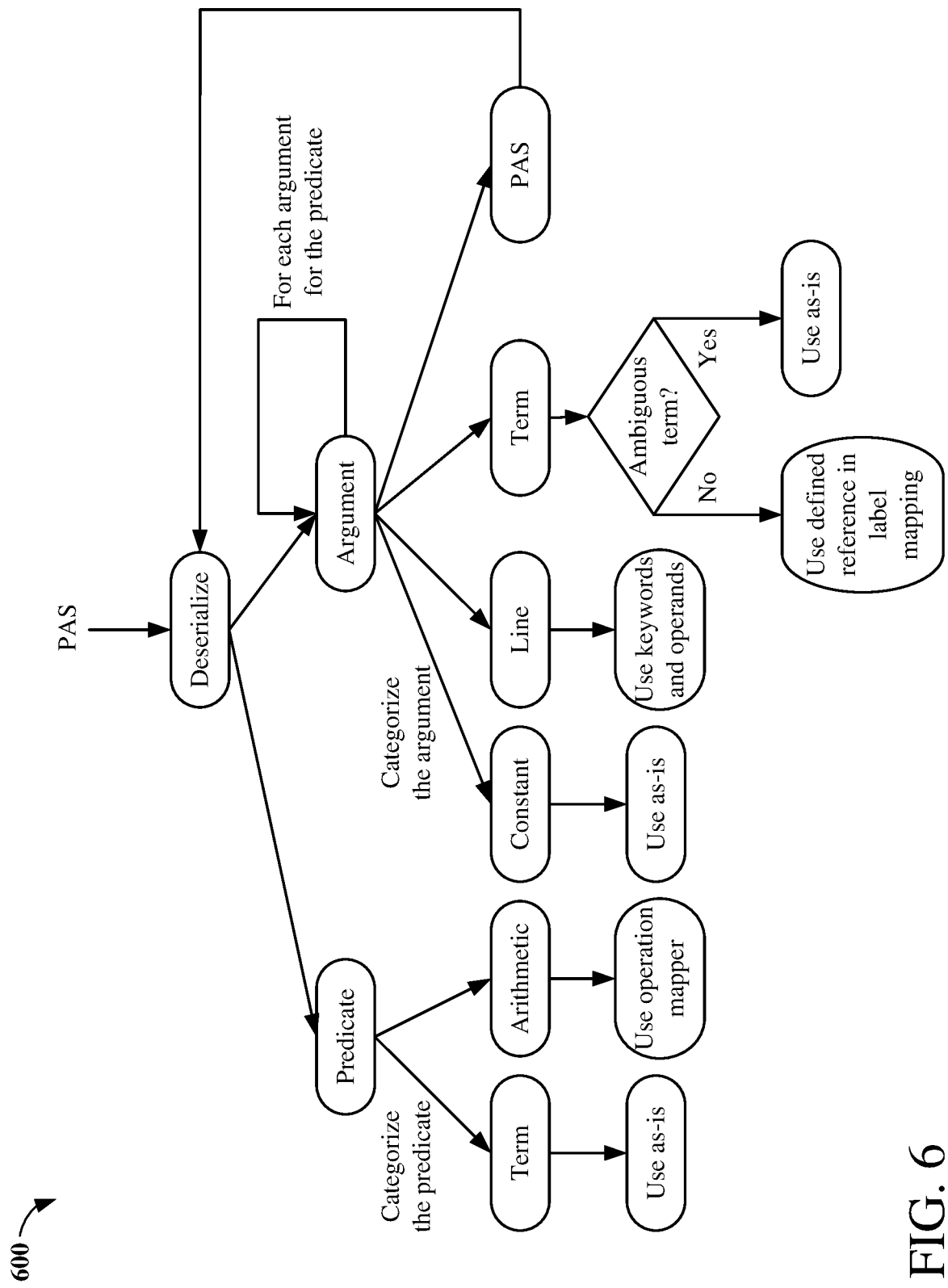
FIG. 6 shows an illustrative flow chart depicting an example operation for breaking down a predicate-argument structure into objects during deserialization and categorizing such objects.

During deserialization, predicates and arguments of a PAS are broken out into separate objects. The computing system 100 determines how to handle a specific object based on the type of object. FIG. 6 shows an illustrative flow chart depicting an example operation 600 of breaking down a PAS into objects during deserialization and categorizing such objects.

A PAS is deserialized into a predicate and one or more arguments. For example, referring back to PAS (I), the predicate is "and" and the arguments for the predicate "and" are "lt" and "retire." As such, "lt" and "retire" are child nodes of "and" (as illustrated in the tree structure 500). To note, a predicate includes a verb and may also include any modifying phrases. Specific operations may thus be associated with the predicate. For example, the verb "add" corresponds to an arithmetic summation operation. An argument is an expression to assist in interpreting a predicate. For example, an argument may be one of the variables to be added for the above arithmetic summation operation. To note, a predicate may be associated with any number of arguments. As such, deserialization includes breaking out each argument for a predicate (illustrated by the feedback loop for each argument for the predicate in FIG. 6).

The system 100 then categorizes the predicate. A predicate may be categorized as an "arithmetic operation" or a "term" that is not defined as an arithmetic operation. For example, an operation mapper maps different verbs to an equivalent arithmetic operation (such as add, sum, and so on for addition; subtract, reduce, remove, and so on for subtraction; and so on). The mapper may be used to identify and map the predicate to a specific arithmetic operation. If the predicate does not appear as an arithmetic operation, the term may be used as-is. For example, the predicate may be kept as an undefined operation for the moment.

The system 100 also categorizes each argument. For tax-specific documents, each argument may be categorized as a constant (such as a set amount of money or other type of static variable), a line or other portion of text corresponding to the argument (such as a text beside a field in a tax form), a specific term (such as "agricultural program payment" in FIG. 2), or a PAS nested in the current PAS (such as "lt" for predicate "and" in PAS (I)). For a constant (which is defined in the PAS), the argument is used as-is. For a line, the system 100 uses keywords and operands (such as from the one or more lexica) to determine one or more variable to be used for the argument. For a term, the system 100 determines if the term is ambiguous. As used herein, a term is ambiguous if it is not defined in the label mapping (such as the term including a defined reference in its array in the label mapping). If the term is not ambiguous, the system 100 uses the defined reference in the label mapping to convert the term to one or more variables or operations (based on the definition in a different segment of the document or a different document). If the term is ambiguous, the term may be used as-is. For example, an undefined term may be kept as undefined in processing the PAS to generate a TPAS. If the argument is a PAS, the system 100 also deserializes the PAS (such as described above). In this manner, nested PASs are deserialized and objects categorized until the entirety of the original PAS is deserialized and categorized.

Referring back to FIG. 5, the tree structure 500 shows the PAS (I) deserialized (without categorization of the nodes in the tree structure 500). In categorizing each node, the predicate "and" may be categorized as a Boolean operation that is an arithmetic operation (defined in the operation mapper). The arguments for the predicate "and" include "lt" and "retire." The system 100 categorized both the "lt" and the "retire" objects as nested PASs. Categorizing an argument as a PAS may be based on the object being followed by an opening parenthesis in the original PAS (such as "lt" and "retire" being followed by "(").

Referring to the "lt" PAS (lt(age(spouse(both))), the system 100 determines "lt" to be the predicate and "age" and "65" to be the arguments. "lt" is categorized as an arithmetic operation (based on the operation mapper). In categorizing the arguments, "65" is categorized as a constant (such as based on being a number without any qualifiers) and "age" is categorized as another nested PAS. The system 100 thus deserializes the "age" PAS (age(spouse(both))). The predicate "age" may be categorized as a term that is kept as-is for the moment. The argument "spouse" is categorized as yet another nested PAS. The "spouse" PAS (spouse(both)) is deserialized, and the predicate "spouse" is categorized as a term (to be used as-is for the moment) and the argument "both" is categorized as a term. The term "both" may be replaced with an appropriate calculation or number of variables defined for the term (such as defined in (i) the line description, and if not in the line description, (ii) the label mapping). For example, the system 100 determines from the segment (1) that both stands for the taxpayer AND the spouse (such as by determining that the term "both" is followed by the qualifier "spouses" in the segment). For tax-specific documents, "both" is an operation that is defined in an operation mapper or other mapping of terms to calculations.

Referring back to the argument "retire" for the predicate "and," the system 100 categorizes "retire" as a nested PAS, and the "retire" PAS (retire(spouse(one), permanent_disability)) is deserialized. The predicate "retire" is categorized as a term (to be used as-is for the moment), the argument "spouse" is categorized as another nested PAS (deserialized similar to as described above), and the argument "permanent_disability" is categorized as a term (to be used as-is for the moment). The argument "one" for the last predicate "spouse" of the "spouse" PAS is a term that is defined in the segment (such as based on the text surrounding the term in the segment; "only one spouse"). For tax-specific documents, "one" is an operation that is defined in an operation mapper or other mapping of terms to calculations (such as described below).

In order to generate a TPAS from one or more deserialized PASs with categorized content, the system 100 may attempt to replace each object categorized as a term in a PAS with one or more calculations or variables defined in the line or defined in another segment. For example, the system 100 uses the label mapping to attempt to replace a term with one or more calculations defined by a defined reference in the array for the term. As noted above (such as with reference to FIG. 3), each term node is to be associated with an array of one or more defined references and/or used references in the label mapping. In generating or updating the label mapping with new references (such as when including a new POJO for an array), the system 100 may identify the reference as a used reference or a defined reference. Identifying a reference of a term as a defined reference or a used reference for the term is based on the classification of the term.

Figure 7:
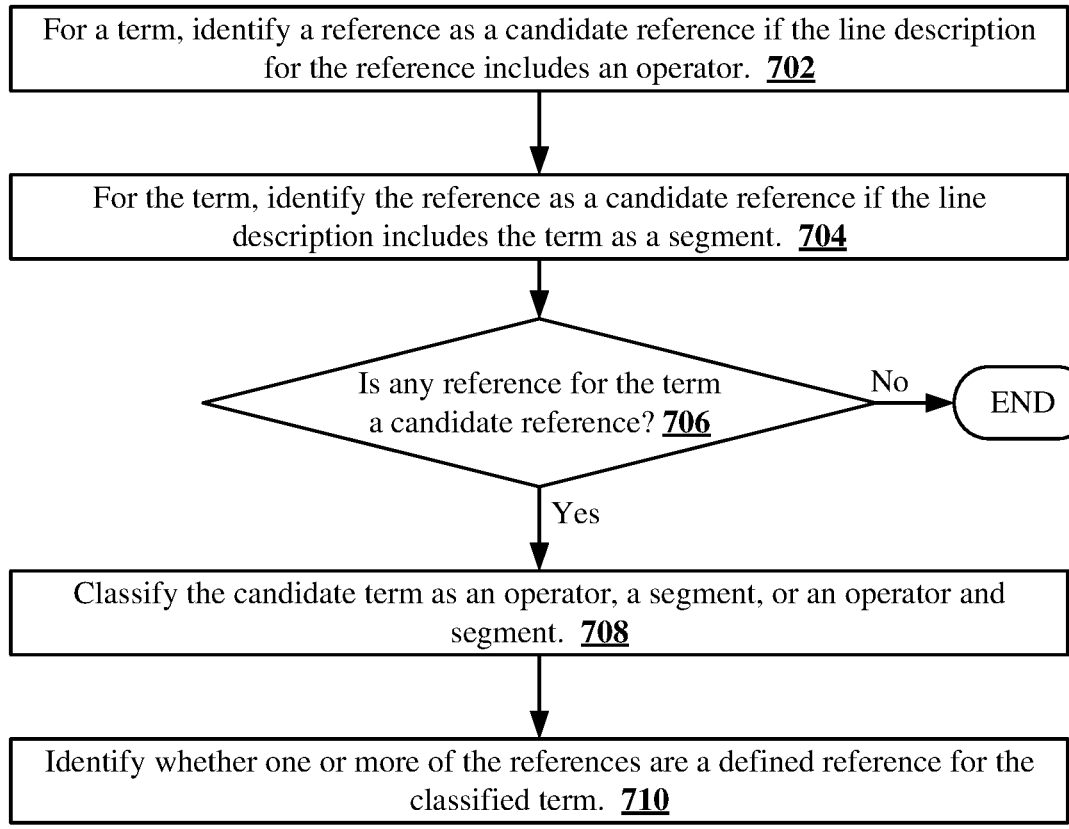
FIG. 7 shows an illustrative flow chart depicting an example operation for categorizing references for terms in a label mapping as a defined reference or a used reference.

FIG. 7 shows an illustrative flow chart depicting an example operation 700 for categorizing references for terms in a label mapping as a defined reference or a used reference. The example operation 700 may be performed by the computing system 100 for each term in the label mapping. At 702, for a term in the label mapping, the system 100 identifies a reference (such as from a POJO constructed for the reference) as a candidate reference if the line description for the reference includes an operator. In the example operation 700, each reference includes the term appearing in a line description, such as shown in the example references in FIG. 2. The system 100 may compare the unigrams or n-grams in the line description to the operation mapper to attempt to identify an operation. If any operation is identified, the reference is identified as a candidate reference. In some implementations, the system 100 marks or flags the POJO for the reference to indicate it is a candidate reference. A candidate reference based on the existence of an operation may be referred to as an operator candidate.

At 704, the computing system 100 identifies the reference as a candidate if the line description includes the term as a segment. For example, the entirety of a sentence structure may be the unigram or n-gram for the term (such as the term "agricultural program payment" in the line descriptions illustrated in each reference in the array in FIG. 2). While not shown, in some implementations, spaces between grams for a term are replaced with underlines or other suitable characters. For example, "agricultural program payment" may be replaced with "agricultural_program_payment". In this manner, character spaces are reserved to indicate separation between terms in the PAS or segment. In addition, a combined/modified term may be replaced with a similar, defined term in modifying a segment or line description. A candidate reference based on the term being a segment in the line description may be referred to as a segment candidate.

At decision block 706, if none of the references are candidate references for a term, the process ends for the term, as none of the references are defined references for the term or may otherwise be used to replace a term in a segment with one or more calculations. In some implementations, the system 100 classifies the term as a single token. The system 100 may disregard single tokens in converting PASs to one or more TPASs. As a result, the single token term may remain undefined or unused for a PAS or TPAS. If at least one of the references for the term is a candidate reference (such as including one or more or an operator candidate or a segment candidate), the term is a candidate term. At 708, the computing system 100 classifies the candidate term as one of an operator, a segment, or an operator and segment (with non-candidate terms classified as a single token).

The system 100 classifies the candidate term based on the type of candidate references identified for the candidate term. If the candidate term is associated with one or more operator candidates and no segment candidates, the candidate term is classified as an operator term. If the candidate term is associated with one or more segment candidates and no operator candidates, the candidate term is classified as a segment term. If the candidate term is associated with one or more segment candidates and one or more operator candidates, the candidate term is classified as an operator and segment term.

At 710, the system 100 identifies whether one or more of the references are defined references for the classified term. If the reference is not an operator reference or a segment reference, the reference is identified as a used reference (which is not used to define the term). For an operator reference, the system 100 determines if the term in the line description for the operator reference is a root node of the dependency graph for the line description. For example, referring to the tree structure 500 in FIG. 5, the system's operations can be conceptualized as determining if the top node in the tree structure 500 includes the classified term. If the term is a root node for the operator reference, the system 100 identifies the operator reference as a defined reference. In this manner, calculations defining the term (that may be determined from the dependency graph for which the term is the root node) may be based on such operator reference. If the term is not the root node for an operator reference, the reference may be identified as a used reference.

For a segment reference, the system 100 determines if the term is a root node of a dependency graph for any segment in the line description. In some implementations, the system 100 modifies the line description by removing spaces between grams of a term (such as replacing them with underlines, as described above), and the system 100 modifies the term similarly to remove spaces between grams. Such a modified term may be referred to as a "combined_term_token". If the combined_term_token is a root node of a dependency graph for any segment of the modified line description, the system 100 identifies the segment reference as a defined reference. Otherwise, the segment reference may be identified as a used reference. If a candidate term is classified as an operator and a segment, a reference that complies with either of the above conditions regarding segment references or operator references is identified as a defined reference. If neither of the conditions are met, the reference may be defined as a user reference. In this manner, for each term in the label mapping, the system 100 identifies the defined references to be used in defining a term appearing in different segments. Thus, in response to an object being identified as a "term" during categorization of a predicate or an argument after deserialization, the system 100 may use the label mapping to attempt to define the term (such as to replace the term with one or more calculations determined from the dependency graph associated with the defined reference for the term). In some implementations, if a term is classified as an operator and a segment, the system 100 may attempt to use an operator reference that is identified as a defined reference in the label mapping if the current instance of the term in the PAS being processed is a predicate. The system 100 may also attempt to use a segment reference that is identified as a defined reference in the label mapping if the current instance of the term in the PAS being processed is an argument. However, any suitable reference in the label mapping may be used to attempt to define the term.

Referring back to FIG. 4, generating the TPAS from the deserialized PAS based on the categorized content (408) may include defining one or more terms typically undefined in the PAS using the label mapping (such as described above). Generating the TPAS from the deserialized PAS may also include reordering or adjusting the predicates (or otherwise reorganizing the nodes) for the PAS. Such reorganization may be based on one or more rules, and the reorganization rules may be referred to as tree traversal rules (as the rules may be visualized using the tree structure/dependency graph associated with the PAS being processed). Some rules apply to single segments, and other rules apply to multiple segments. Both types of rules are described below with examples and illustrated using tree structures for clarity in understanding the tree traversal rules.

A first tree traversal rule for single segments is a "Both" or "isOneOf" term rule. "Both" is a term that may be associated with an operation requiring multiple conditions to be true. For example, the term "Both" in the text "Both spouses were under 65" requires that the taxpayer AND the spouse were under the age of 65. "isOneof" is a term that may be associated with an operation requiring one and only one condition be met. For example, the term "only one" may map to the "isOneof" term (such as based on a lexicon or using a label mapping or operation mapping), and the term "only one" in the text "only one spouse retired on permanent and total disability" requires that one and only one of either the taxpayer or the spouse retired on disability. "isOneof" term may also be referred to as "one" term (such as illustrated in the tree structure 500 in FIG. 5).

A line description (A) may be segment (1) above, which includes both terms (in exact or mapped, similar terms). The line description is one segment (such as based on being one sentence indicated by the punctuation/period ending the sentence). The PAS (I) above is for the segment of line description (A) above. The tree structure/dependency graph for the PAS (I) is illustrated as tree structure 500 in FIG. 5.

Figure 8:
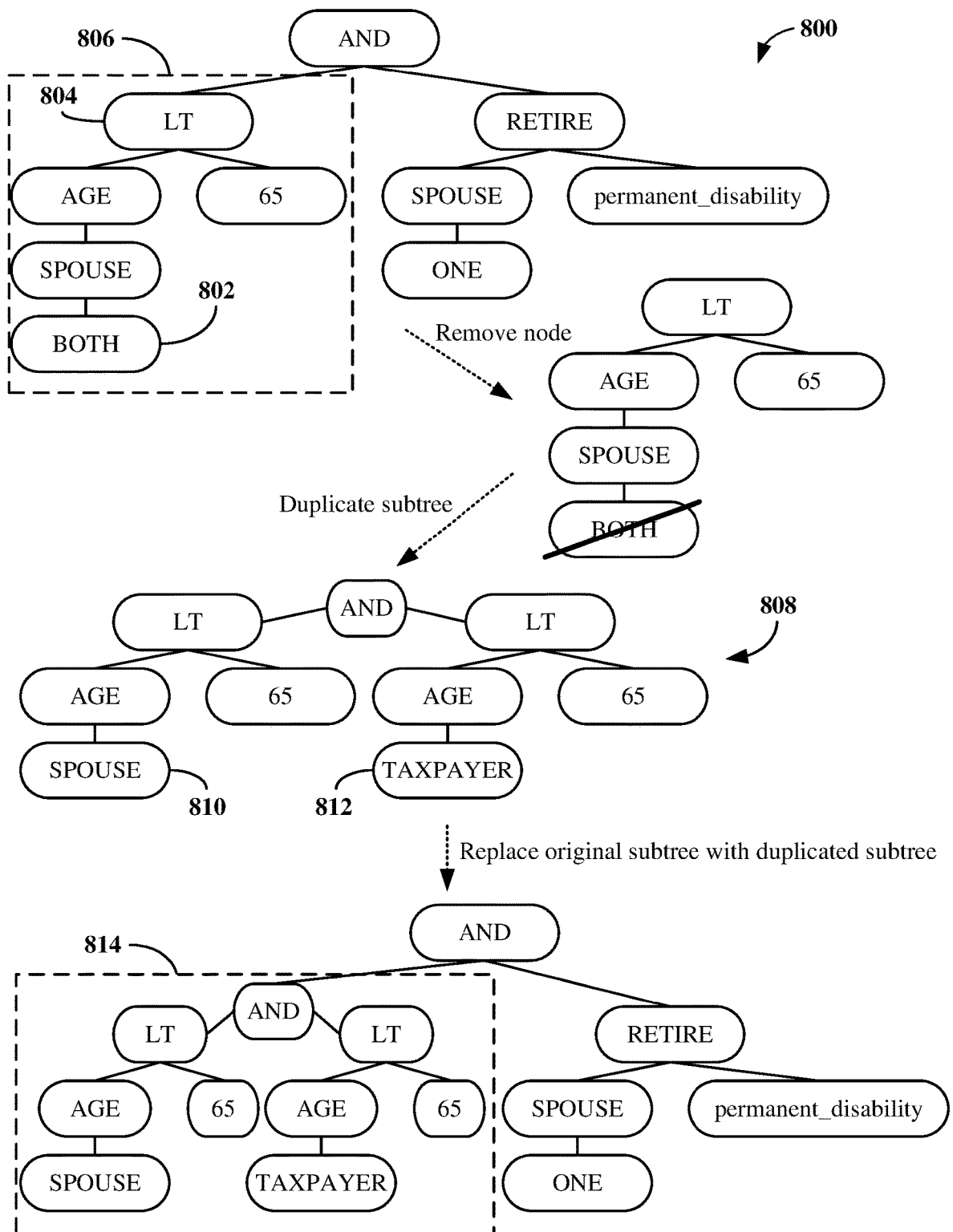
FIG. 8 shows the example tree structure in FIG. 5 being reorganized based on an example "both" and "one" tree traversal rule.
Figure 8:
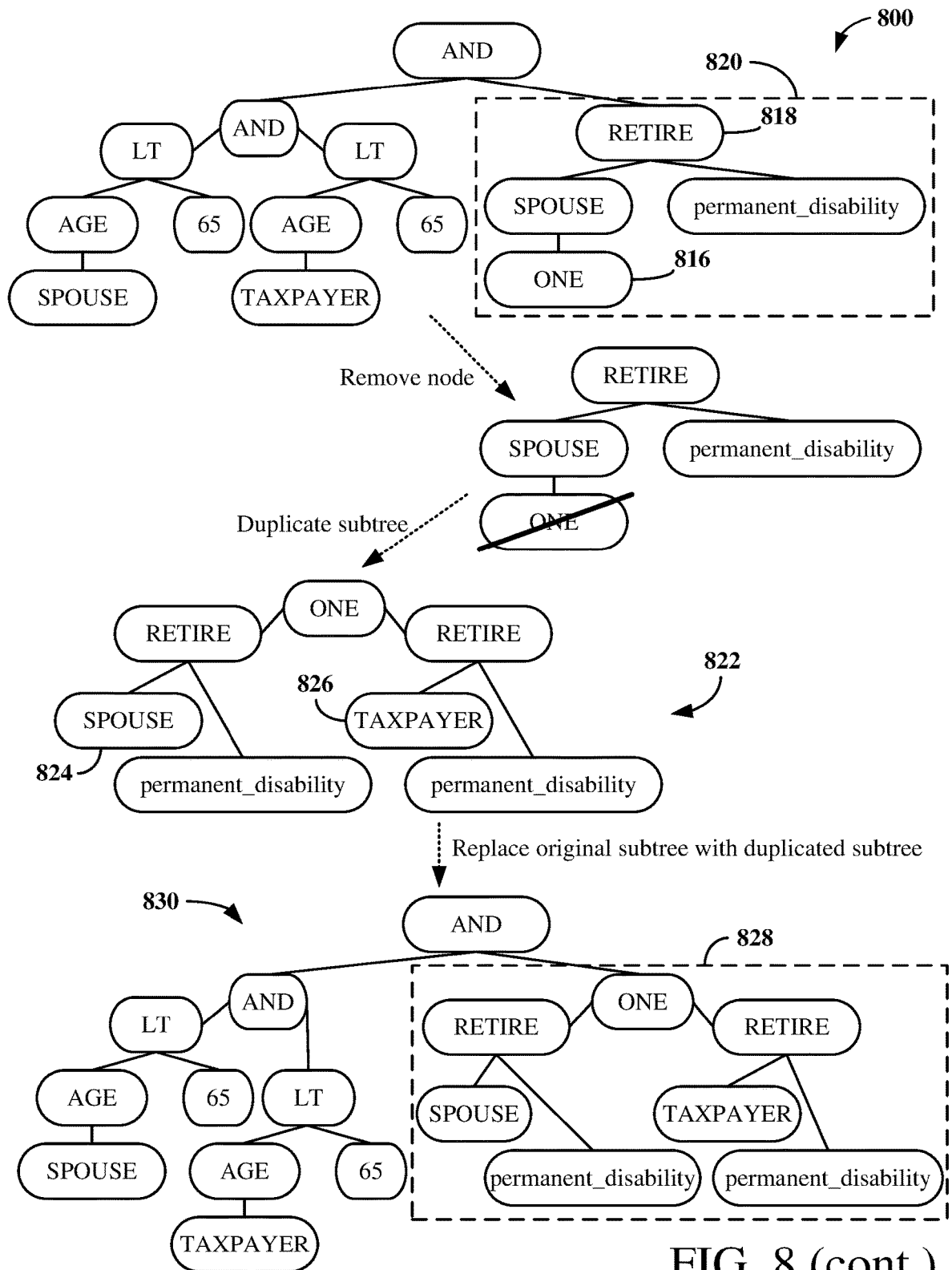

Terms "one" and "both" are associated with a compare operation (since the terms require either only one condition occurring or both conditions occurring, such as described above). For a tree traversal rule regarding a "both" node/term or a "one" node/term, the system 100 identifies the base node that is a compare operation in the parent chain for the node. For example, for the "both" node in PAS (I) (and as illustrated in the tree structure 500 in FIG. 5), the base node that is a compare operation is the "lt" node (corresponding to a less than operation). FIG. 8 shows the example tree structure in FIG. 5 being reorganized (800) based on an example "both" and "one" tree traversal rule. The operations of the system 100 performing such tree traversal rule is described with reference to FIG. 8. Regarding the above described operations, the system 100 identifies node "both" 802 in the PAS (I). The system 100 then moves outerwise in the nested brackets of the PAS (I) (thus logically moving up the tree segment 500, which is illustrated at the top of FIG. 8) until identifying the compare node "lt" 804 (which is the base node for the "both" node 802). In this manner, subtree 806 defined by the base node 804 corresponds to the "both" node 802.

With the base node 804 identified, the computing system 100 removes the "both" node and duplicates the subtree 806 without the "both" node (as illustrated by subtree 808). Subtree 808 may be referred to as a duplicated subtree. In duplicating the subtree, the "both" node indicates that two conditions are two occur, and "both" is modified in segment (1) to correspond to conditions for a spouse and a taxpayer. The "spouse" node 810 exists in the original subtree (806). Therefore, the system 100 fills the extra subtree with the other entity for the condition ("taxpayer", as shown in node 812). As noted above, "both" indicates that the two conditions occur. Thus, the system 100 joins the two subtree branches with an "and" node to indicate that both calculations are to occur (as illustrated in the duplicated subtree 808).

The computing system 100 then replaces the portion of the PAS corresponding to the original subtree 806 ("lt(age (spouse(both)), 65)") with the operations corresponding to the duplicated subtree 808, as shown by subtree 814 (corresponding to "and(lt(age(spouse), 65), lt(age(taxpayer), 65))"). In this manner, for the TPAS, the "both" object is excluded from the operations so that multiple iterations of the PAS is not required to perform all calculations.

A similar technique occurs for the "one" node. For the "one" node, only one of multiple conditions is to occur. In segment (1), only one of the spouse or the taxpayer retires with "permanent and total disability." Therefore, instead of joining duplicated subtree branches with an "and" node (such as for "both" described above), the branches are joined with a "one" node. Referring back to FIG. 8 (with the original subtree 806 replaced with subtree 814), the system 100 identifies the "one" node 816. The system 100 then attempts to identify a base node in the parent tree for the "one" node 816 that is a compare operation. For example, the system 100 works outerwise through the parenthesis of the PAS until reaching a compare operation. However, no compare operations exist in the subtree 820. If no compare operation is identified by the system 100 for the node, the computing system 100 may identify the parent of the parent of the node (two parenthesis out) of the node as the base node. For example, the system 100 may identify "retire" node 818 as the base node for the "one" node 816.

Similar to as described above, the "one" node is removed from the subtree 820 (defined by the base node 818), and the subtree 820 without the "one" node 816 is duplicated. Similar to the "both" operation, the multiple conditions are regarding entities "spouse" and "taxpayer". The original subtree 820 includes the "spouse" node (as illustrated by node 824). Thus, the new subtree branch in the duplicated subtree 822 includes a "taxpayer" node (as illustrated by node 826). Since the node 816 is a "one" condition/operation, the duplicated subtree branches are joined using a "one" node (as shown in subtree 822). The computing system then replaces the portion of the PAS when converting to TPAS corresponding to original subtree 820 ("retire (spouse(one), permanent_disability)") with the operations corresponding to the duplicated subtree 822, as shown by the subtree 828 in tree structure 830 (corresponding to "one (retire(spouse, permanent_disability), retire(taxpayer, permanent_disability))". In this manner, multiple iterations of the PAS are not required to perform operations corresponding to the "one" node 816.

In some implementations, the TPAS is the computer-executable operations corresponding to the tree structure 830. The example TPAS (resulting from the interpretation and manipulation of PAS (I)) is provided below:

TPAS: and(and(lt(age(spouse), 65), lt(age(taxpayer), 65)), one(retire(spouse, permanent_disability), retire(taxpayer, permanent_disability))

While the example shows the "both" being processed before the "one" in reorganizing the PAS, such nodes may be processed in any suitable order (or concurrently). For example, the system 100 may process such nodes for the tree traversal rule in the order identified when reading the PAS from left to right.

Figure 9:
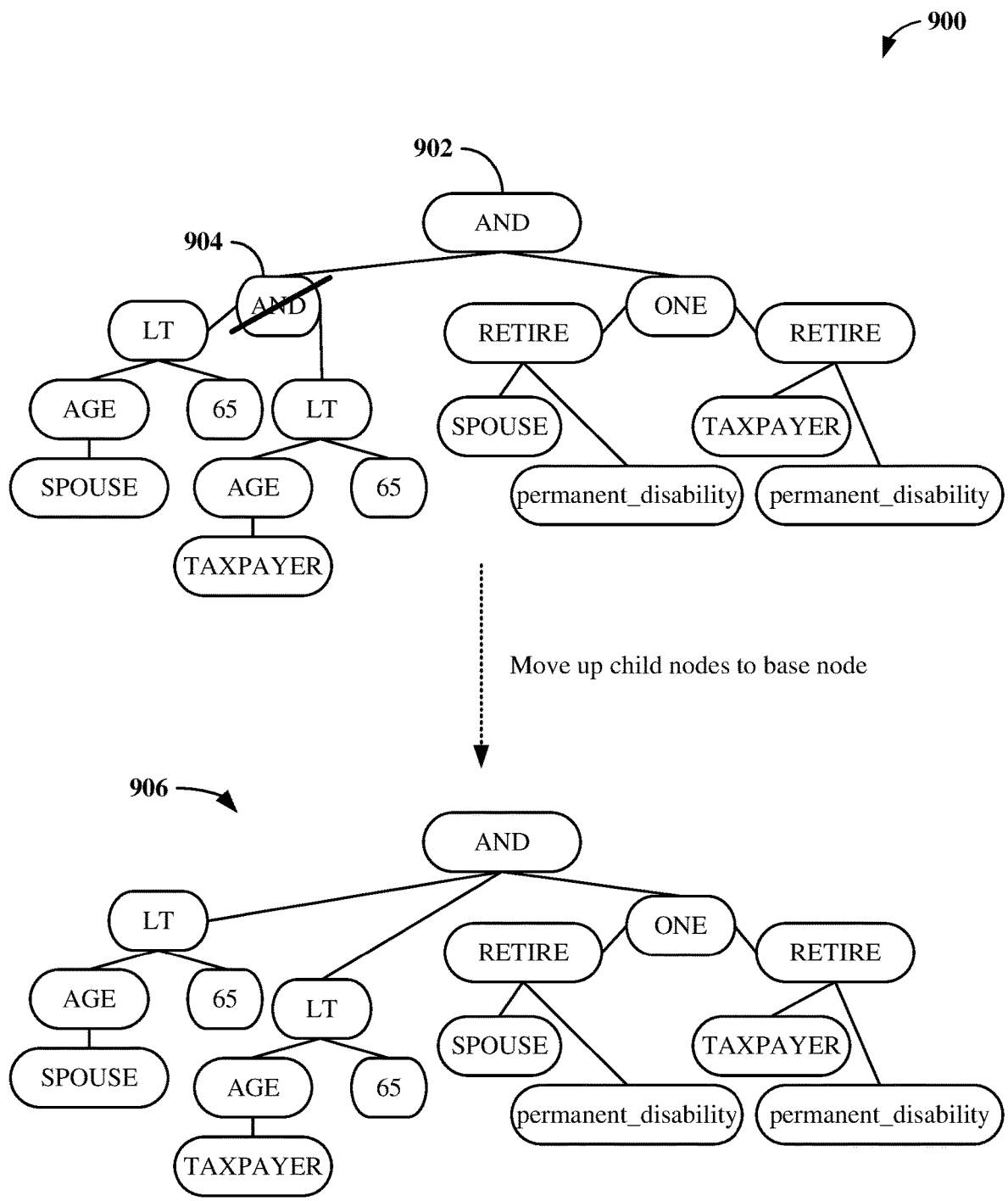
FIG. 9 shows the example final tree structure in FIG. 8 being reorganized based on an example repeating node tree traversal rule.

Another tree traversal for a single segment is regarding repeating nodes. In some implementations, if a parent "and" node includes a child "and" node, the system 100 removes the child "and" node. Similarly, if a parent "or" node includes a child "or" node, the system 100 removes the child "or" node. In Boolean Logic, an AND operation plus an AND operation is an AND operation, and an OR operation plus an OR operation is an OR operation. Therefore, the repeating child node is extraneous. Referring to the above TPAS, the root "and" node includes a child "and" node. FIG. 9 shows the example final tree structure 830 in FIG. 8 being reorganized (900) based on an example repeating node tree traversal rule. As shown, "and" node 902 includes child "and" node 904. The computing system 100 thus removes the child "and" node 904, and the computing system 100 moves up the child nodes of the "and" node 904 to the base node 902 (as shown in modified tree structure 906). In this manner, the duplicate term may be removed from the TPAS. The example TPAS associated with tree structure 906 is below:

TPAS: and(lt(age(spouse), 65), lt(age(taxpayer), 65), one(retire(spouse, permanent_disability), retire (taxpayer, permanent_disability))

As shown, one set of parenthesis is removed from the TPAS by removing the second "and". In this manner, less nested operations occur in executing the TPAS (thus allowing the system 100 to execute the operations more efficiently and expeditiously).

Another tree traversal rule for a single segment is regarding "other" nodes. An "other" node may refer to the other condition associated with the "one" operation not being met (with only one condition from multiple conditions to be met for the "one" operation). In this manner, "other" may be associated with a comparison that includes another branch. Such operation may logically be compared to a TRUE/FALSE condition. If an "other" node in a tree structure is associated with a compare operation base node, the tree structure also includes a "one" node (with the "one" corresponding to TRUE and the "other" corresponding to FALSE in a TRUE/FALSE condition). The system 100 executing the PAS including the "other" and "one" nodes requires multiple iterations of the PAS as a result of such nodes. In some implementations, the computing system 100 reorganizes the PAS based on the "other" node tree traversal rule to remove the nested "other" node and move the "one" node to a more efficient location in the PAS (such as the root node).

Figure 10:
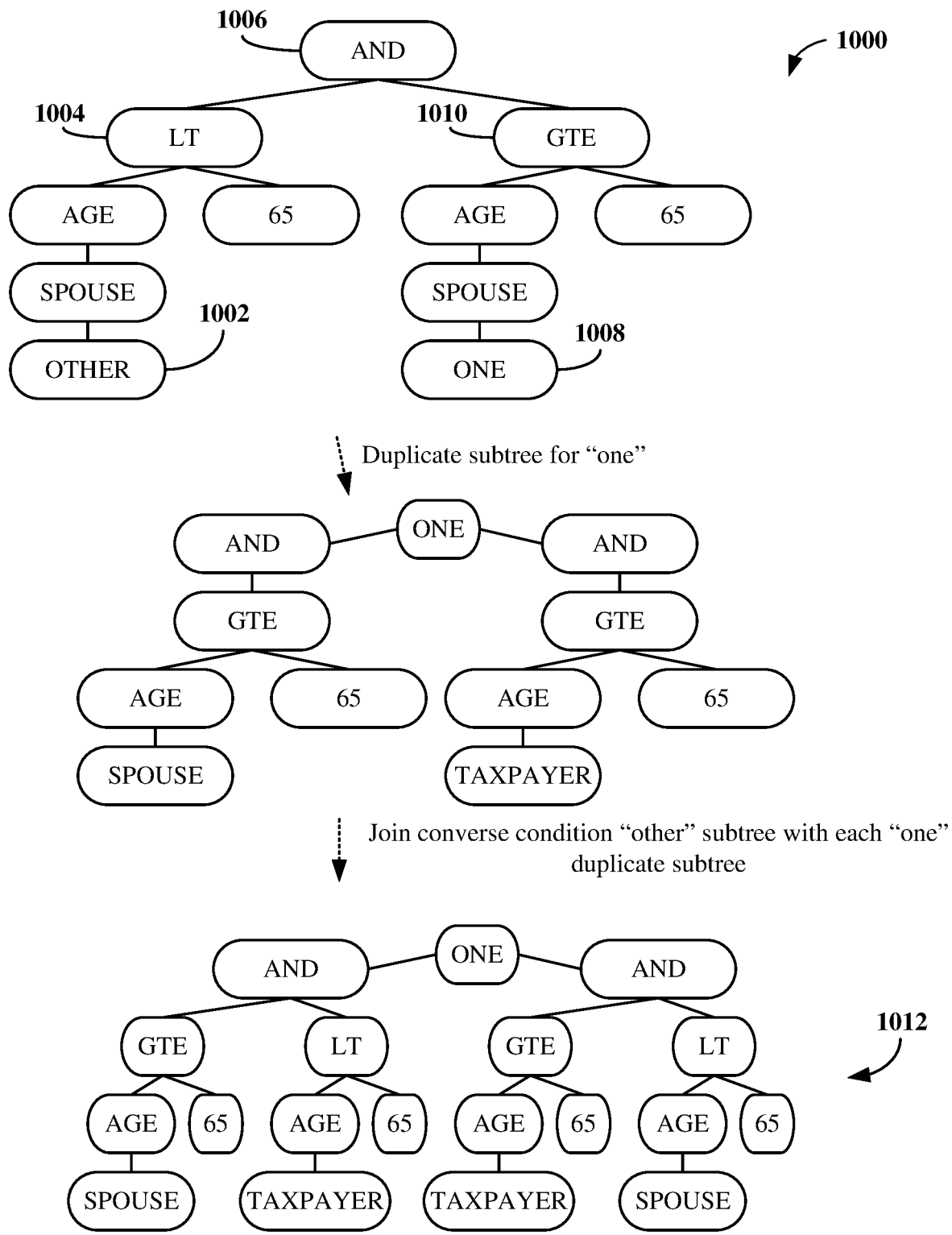
FIG. 10 shows an example tree structure being reorganized based on an example "other" tree traversal rule.

FIG. 10 shows an example tree structure being reorganized (1000) based on a system 100 reorganizing a PAS (resulting in a reorganization of predicates and arguments in the TPAS). The PAS is based on an example "other" tree traversal rule. The PAS associated with the original tree structure in FIG. 10 is "and(lt(age(spouse(other), 65), gte (age(spouse(one), 65)))". "gte" refers to a "greater than or equal to" compare operation. In some implementations, the above PAS is a contrapositive statement of the more compact PAS gte(age(spouse(both))), 65), assuming that both persons are not under 65 (since at least one claims retirement in the above example). Such PAS corresponds to a text statement that "both the spouse and the taxpayer are at least 65". The computing system 100 may thus need to determine if the contrapositive statement to the PAS occurs.

In this manner, the system 100 is to calculate (i) if the spouse (and not the taxpayer) is greater than or equal to 65 or (ii) if the taxpayer (and not the spouse) is greater than or equal to 65. For the "other" tree traversal rule, the computing system 100 identifies an "other" node in the PAS (such as illustrated as node 1002 in the tree structure in FIG. 10). In identifying the "other" node, the system 100 moves outerwise through the parenthesis in the PAS (logically moving up the parent chain of the "other" node 1002 in the tree structure) until a compare operation node is identified. In the example tree structure, the "lt" node 1004 is identified as the base node for the "other" node 1002. If no compare operation is identified, the system 100 may not reorganize the PAS based on the "other" tree traversal rule.

With the base node 1004 identified, the system 100 determines if the parent node to the base node 1004 includes conjunctive or disjunctive behavior. For example, the system 100 determines if the parent node is "and" or another operation defined as a conjunction or is "or" or another operation defined as a disjunction (such as being defined in the operation mapping or another lexicon or mapping to which the system 100 refers in determining if the parent node includes conjunctive or disjunctive behavior). In the example tree structure in FIG. 10, the parent node "and" 1006 includes conjunctive behavior (such as being defined by such by a mapping). The system 100 may identify the parent node (such as node 1006) as a connector if the node includes conjunctive or disjunctive behavior. The system 100 then identifies the subtree from node 1006 including the "one" node (such as the subtree defined by the "gte" node 1010 including the "one" node 1008).

The portion of the example PAS corresponding to the identified subtree is "gte(age(spouse(one)), 65)". The system 100 duplicates the subtree from the parent node 1006 (and excluding the other subtrees without the "one", such as the subtree defined by node 1004) and joins them using a "one" node (with "one" node 1008 being removed). Similar to the "one" tree traversal rule described above, the entities are changed in the duplicated branches (such as one branch including "taxpayer" while the original subtree's branch includes "spouse"). The portion of the example PAS through such transformation is "one(and(gte(age(spouse), 65)), and (gte(age(taxpayer), 65)))" and is illustrated in FIG. 10.

The "other" node's subtree (defined by "lt" node 1004) is the additional condition for the "one" node 1008. If the "and" node 1006 would include additional child nodes, the subtrees defined by the child nodes may also be additional conditions. The system 100 combines an instance of each child node subtree with each branch of the duplicated subtree (at each instance of the conjunction or disjunction node). As illustrated in the example in FIG. 10, an instance of the subtree defined by node 1004 is combined with each branch of the duplicated subtree at the "and" node. As shown, the entities in the subtrees that are joined are contrapositive or different from the entity in the branch of the duplicated subtree. For example, a subtree for the "lt" node with a "taxpayer" entity is joined with the "gte" node's branch including a "spouse" entity. Similar to removing the "one" node 1008, the system 100 removes the "other" node 1002.

After combining the branches, the resulting TPAS (from interpreting and manipulating the PAS) no longer retains the "other" node and "one" node that were nested. In this manner, less iterations of the TPAS (than the PAS) may be required in performing the operations. The TPAS associated with tree structure 1012 may be defined as the TPAS for the segment. The TPAS may thus be:

TPAS: one(and(gte(age(spouse), 65), lt(age(taxpayer), 65)), and(gte(age(taxpayer), 65), lt(age(spouse), 65))

As can be conceptualized, the system 100 is able to execute the above TPAS without requiring multiple iterations or recursive operations. As such, execution of the operations is more efficient. In some implementations, a mapping, lexicon, or other suitable reference defines an operation regarding "one" and "other" as an "IsOneOf" operation. The "IsOneOf" operation may be specific to tax-related documents and operations for generating TPASs. In this manner, the root node "one" in the tree structure 1012 (used to join the instances of the parent node 1006) may instead be an "IsOneOf" node to indicate the "one" "other" relationship. Such relationship indicated by "IsOneOf" may also correspond to the relationship between "both" and "one" operations/conditions.

Another tree traversal rule for a single segment is regarding "if" nodes. A PAS including an "if" node may also include a "then" node corresponding to the "if" node (which may be conceptualized as an IF/THEN statement). For example, tax documents including an "if" operation may also include a "then" operation. One example segment illustrating such is "If the result is less than or equal to 0 then enter 0." Another example text may include a comma instead of the "then" being explicitly included ("If the result is less than or equal to 0, enter 0."). In generating the PAS using one or more lexicons, grammar rules, and heuristics, the comma may be replaced with the "then" operation. An example PAS associated with the above text is ((if(lte(var, 0)), (then(0))). "var" may refer to a variable, and the variable is defined by an immediately prior segment's PAS (such as the "result" being an output from executing an immediately preceding PAS).

Figure 11:
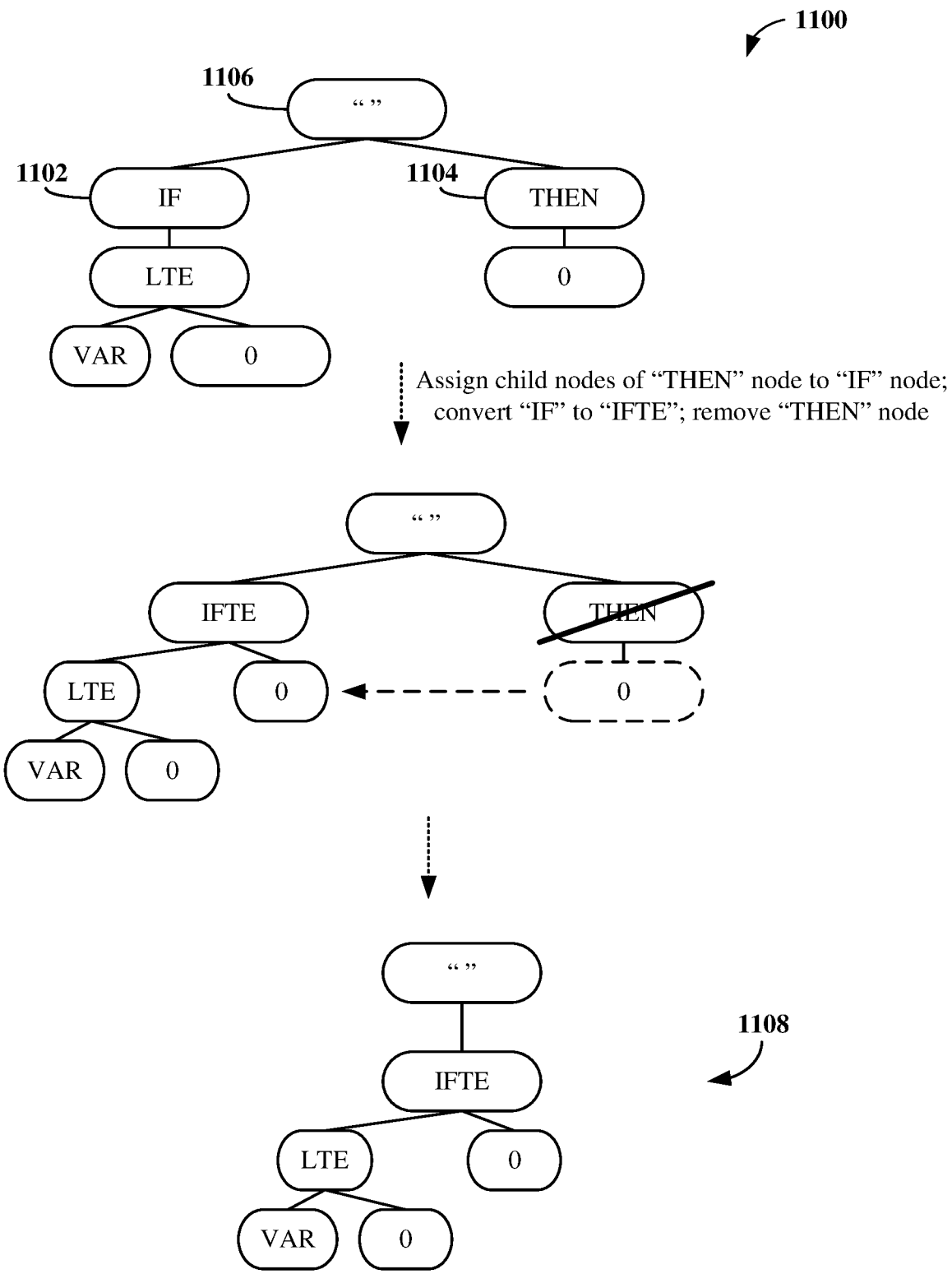
FIG. 11 shows an example tree structure being reorganized based on an example "if" tree traversal rule.

FIG. 11 shows an example tree structure being reorganized (1100) based on an example "if" tree traversal rule. The computing system 100 first identifies an "if" node in the PAS (illustrated as the "if" node 1102 in the tree structure in FIG. 11 for the above example PAS). The computing system 100 reviews the PAS including the "if" node (such as reading the PAS from left to right) to identify a "then" node (such as "then" node 1104 in the tree structure in FIG. 11). As shown, the nodes 1102 and 1104 are child nodes of node 1106 (with " " indicating an undefined or null node). If the computing system 100 does not identify a "then" node in the PAS, the computing system 100 may not transform the PAS based on the "if" tree traversal rule.

If a "then" node is identified, the child nodes of the "then" are assigned to the "if" node. The "then" node is removed. The system 100 also converts the "if" node to an "ifte" node, with the child nodes previously assigned to the "then" node assigned to the "ifte" node (as illustrated in FIG. 11). The term "ifte" refers to an if/then operation. In some implementations, a mapping, lexicon, or other suitable reference defines the operation "ifte" that includes the associated operations "if" and "then" for a PAS. For example, PAS portion ifte(lte(var, 0), 0) refers to "If the result/variable is less than or equal to 0 then enter 0". With the child nodes of the "then" node 1104 moved, the "then" node removed, and the "if" node 1102 converted to an "ifte" node, the transformed PAS is associated with the tree structure 1108 (after application of the "if" tree traversal rule). The example PAS may be "(ifte(lte(var, 0), 0))". If/then operations may be performed in a sequential manner of determining if the if condition is true before performing the then operation. Thus, the transformed PAS with the "ifte" operation may be efficiently executed by the system 100 with fewer nested operations.

In some implementations, "ifte" is an operation defined as IF/THEN/ELSE. In this manner, if a condition is true, then perform an action. Else, perform a different action. If "ifte" is defined as IF/THEN/ELSE and does not include a third argument (such as "ifte(condition, operation, blank)" which equals "ifte(condition, operation)"), no operation may be associated with the else entity (such as shown in the example in FIG. 11).

Another tree traversal rule for a single segment is regarding null or ignored nodes. As noted above, the label mapping may ignore single token terms or otherwise not define a term that may appear in a PAS. As a result, the associated node may not be defined or used for performing operations associated with the PAS. Such as node may be referred to as a null node or an ignored node. In some implementations, the system 100 maintains a list of ignored or null labels. For example, the system 100 may be able to identify labels in the label mapping without a defined reference. Labels without a defined reference in the mapping are an ignored label (which is thus associated with an ignored or null node). Referring back to FIG. 11, node 1106 (" ") is an ignored/null node. Referring back to the PAS associated with the tree structure, the PAS includes an additional set of parenthesis without a predicate preceding or any form of operator for the parenthesis. The parenthesis may thus be associated with a null node.

Figure 12:
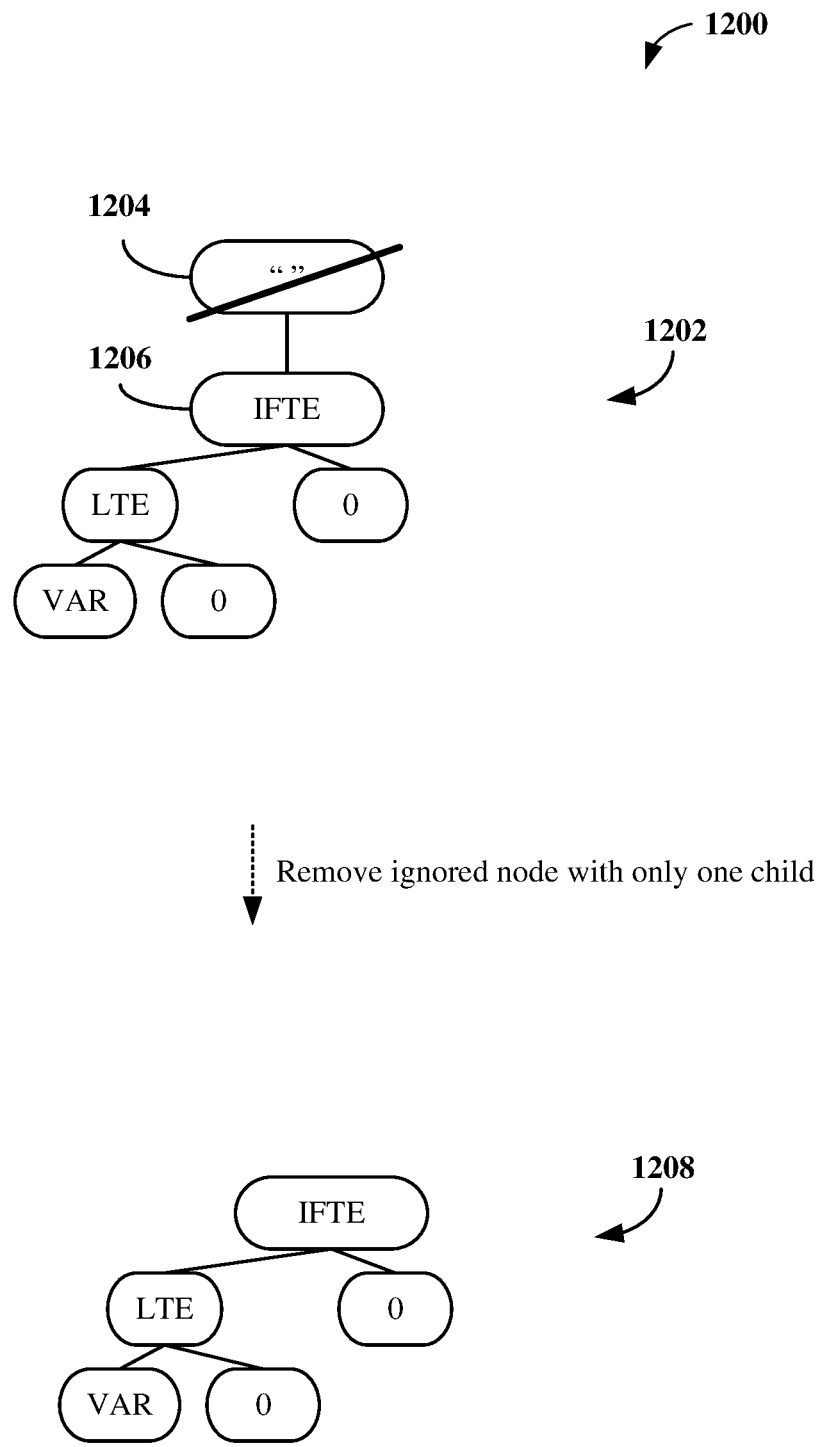
FIG. 12 shows an example tree structure being reorganized based on an example ignored node tree traversal rule.

FIG. 12 shows an example tree structure being reorganized (1200) based on an example ignored node tree traversal rule. For the ignored node tree traversal rule, the system 100 identifies an ignored node (such as identifying an extraneous set of parenthesis in the PAS, which may be illustrated as node 1204 of tree structure 1202. Tree structure 1202 is the final tree structure 1108 from FIG. 11. If an ignored node is identified (such as based on not including a defined reference in the label mapping or otherwise being defined (such as otherwise in the line description including the segment), the system 100 determines if the ignore node includes one and only one child node. If the ignored node includes more than one child node, the system 100 may not transform the PAS based on the ignored node tree traversal rule. If the system 100 identifies that the ignored node includes only one child node, the system 100 removes the ignored node (such as by removing the extraneous set of parenthesis in the PAS). As illustrated by the tree structure 1202, node 1204 is removed because node 1206 is the only child node. As a result, "ifte" node 1206 becomes the root node (as shown in tree structure 1208 corresponding to the transformed PAS. Showing the change from PAS to transformed PAS for the example in FIG. 12 is shown below:

PAS: (ifte(lte(var, 0), 0)) Transformed PAS: ifte(lte(var, 0), 0)

As shown, just the outer set of parenthesis is removed. When the system 100 processes the transformed PAS, though, the system 100 does not require analyzing or attempting to execute operations associated with the extraneous set of parenthesis (leading to more efficient execution of operations associated with the PAS).

In addition or alternative to the one or more tree traversal rules for single segments, one or more tree traversal rules may also exist for multiple segments. For example, a line description may include more than one segment. An example line description with multiple segments is below:

> If you completed line 11, enter the smaller of line 10 or line 11. All others, enter the amount from line 10.

The line description includes two segments: a first segment "If you completed line 11, enter the smaller of line 10 or line 11" and a second segment "All others, enter the amount from line 10". A PAS may be generated for each segment of a line description. An example PAS for the first segment is "(if(not(isBlank(line(11)), then(min(line(10),line(11))))". "isBlank" is a defined operation to determine whether a field or line or other variable in the operation is left blank in a form. "not" is a logical NOT (contrapositive) operation. "min" is a defined minimum operation. An example PAS for the second segment is "other(line(10))". As can be seen, the second segment (and thus the second PAS) depends on the first segment (and thus the first PAS). One or more tree traversal rules for multiple segments may be used by the system 100 to combine multiple PASs into one PAS (such as a TPAS).

A first multiple segment tree traversal rule is a presence of a condition tree traversal rule. To apply the rule in transforming multiple PASs, the computing system 100 identifies whether a PAS includes an "if" node, "else" node, "other" node, or "then" node (which are terms conditional on another term or operation). If any of the PASs for multiple segments of a line description include at least one of the above nodes, it may be assumed that the corresponding segments of the line description are connected in some fashion based on an "ifte" logical connector (an IF/THEN statement or an IF/THEN/ELSE statement). Referring to the above example line description, the two segments may be represented by one PAS including an "ifte" node instead of two separate PASs.

In applying the presence of a condition tree traversal rule, the system 100 transforms the first PAS based on the "if" tree traversal rule (as well as any other suitable single segment tree traversal rules). For example, the PAS "(if(not(isBlank(line(11)), then(min(line(10),line(11))))" may be converted to "ifte(not(isBlank(line(11))), min(line(10),line(11)))" by the system 100 based on the "if" tree traversal rule and the ignored node tree traversal rule. The system 100 then attempts to insert the second PAS (for the second segment) into the else argument of the "ifte" operation. In this manner, the transformed PAS may be "ifte(not(isBlank(line(11)), min(line(10), line(11)), line(10))". In some implementations, the system 100 replaces "line" references in a PAS with references to the specific location of the object (such as where the object appears in a specific form and in a specific line). For example, the system 100 replaces "line(10)" and "line(11)" in the first PAS with the specific locations referred to by the lines ("ifte(not(isBlank(F1040ScheduleR::11)), min(F1040ScheduleR::10, F1040ScheduleR::11))"). Such a PAS is specific to a taxation corpus of documents and text, and the locations may be based on specific labels in the label mapping (such as indicating the specific document and field or line being referenced by the entity line(x) in the PAS; such as IRS Form 1040, Schedule R, Line 11 for F1040ScheduleR::11). Referring back to the example label mapping 200 in FIG. 2, the system 100 may obtain such information from the label mapping (which was previously collected and generated by the system 100 or another suitable computing system) for insertion into the PAS. The TPAS for the above example line description may thus be "ifte(not(isBlank(F1040ScheduleR::11)), min(F1040ScheduleR::10, F1040ScheduleR::11), F1040ScheduleR::11)".

Another multiple segment tree traversal rule is a presence of an action tree traversal rule. Typically for tax-specific segments, an operation in the PASs for a line description results in a value being assigned to a line in a document. The remainder of the text in the line description typically describes individual actions in conjunction with the value assignment to the line. For example, an example line description including multiple segments is below:

> Enter the smaller of line 20 or line 21. Also enter this amount on Schedule 3 (Form 1040 or 1040-SR), line 6.

The first segment is "Enter the smaller of line 20 or line 21." The second segment is "Also enter this amount on Schedule 3 (Form 1040 or 1040-SR), line 6". As shown, both segments are regarding entering an amount at a designated location (such as the line associated with the line description for the first segment and the Schedule 3, line 6 of IRS form 1040 for the second segment). The system 100 may generate a PAS for each segment. The first PAS associated with the first segment is "min(line(20),line(21))", and the second PAS associated with the second segment is "copyTo(var, schedule(3,line(6)))". "copyTo" is defined as an additional enter command (such as placing the var in an additional, indicated location). The system 100 may identify that both PASs include operations for entering values (such as based on the identified operators). Based on identifying both PASs being directed to entering values, the system 100 may concatenate the two PASs to generate a TPAS. This may be based on that the entering operations may be performed sequentially in an efficient manner (as the system 100 processes the TPAS from left to right). The example TPAS for the multiple PASs is below:

> min(F1040ScheduleR::20, F1040ScheduleR::21);
> copyTo(min(F1040ScheduleR::20, F1040ScheduleR::21), F1040Schedule3::6)

The first PAS and the second PAS are joined by a semicolon to generate a single TPAS. Similar to as described above, specific line references may be replaced with specific locations to generate the TPAS for the line description.

Presence of a condition and presence of an action may exist for a single line description with multiple segments. In particular, for taxation-specific text, a conditional statement can occur after calculating the condition, and the conditional statement may end with an action. For example, the following line description includes an "if" conditional statement that begins with calculating the condition (before introduction of the conditional statement) and ends with an action to be performed:

> Subtract line 18 from line 12. If zero or less, stop; Otherwise go to line 20

If the system 100 identifies a conditional statement in a PAS, an argument to the conditional statement may be "var", which refers to a value from the previous segment. For example, the two PASs for the above line description (including two segments) are "sub(line(12),line(18))" and "ifte (lte(var,0), stop, goto(line(20)))" (after "ifte" in introduced by transforming the second PAS based on single segment tree traversal rules described above, including the "if" tree traversal rule). As shown, the second PAS include var, referring to the first PAS. If the system 100 identifies a var in a segment, the system 100 may replace the var with the previous PAS. In this manner, the two PASs above are transformed to a single TPAS (with conversion of line references to specific locations) below (with each portion of the ifte operation in the TPAS annotated):

```
ifte(
    lte(sub(F1040ScheduleR::12, F1040ScheduleR::18), 0),    //If condition
    stop,                                                    //Then (If True) action
    goto(F1040ScheduleR::20))                                // Else (If False) action
```

In this manner, the system 100 may transform one or more PASs to generate a field specific PAS (such as a TPAS). Transforming one or more PASs into a TPAS may include one or more of: defining terms in a segment based on a definition of the term from a different segment or line description (including from a different document); reordering nodes, replacing nodes, or removing nodes of a segment (such as based on one or more single segment tree traversal rules); or combining multiple PASs for multiple segments of a single line description based on one or more multiple segment tree traversal rules. The generated one or more TPASs organizes the operations to allow the computing system 100 to more efficiently execute the operations of the TPASs (such as by removing redundancies, unnesting operations, or placing operations in a more logical order). The generated one or more TPASs may also include fewer undefined terms than the original PASs that may cause errors in processing by the system 100 (since terms may be defined from any place within the corpus for the TPAS other than the immediate segment or line description for the PAS). As such, operation of the computing system 100 is improved through conversion of one or more PASs to one or more TPASs, as described above.

As noted above, the one or more computer-executable operations (such as the TPASs) generated by the computing system 100 are to be executed during execution of a field specific program (such as a tax-related program, including tax preparation applications). In some implementations, execution of the operations cause the system 100 to generate one or more tax documents (such as tax return forms and schedules) during execution of the program. In this manner, the system 100 may ingest tax forms and instructions (or PASs generated from the tax forms and instructions), convert the text to TPASs, and generate and output the tax return documents based on executing the TPASs. The system 100 may also use the interface 110 to submit the tax return documents to the proper taxation authorities or accounting services upon completion.

As used herein, a phrase referring to "at least one of" or "one or more of" a list of items refers to any combination of those items, including single members. As an example, "at least one of: a, b, or c" or "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of generating one or more computer-executable tax-specific predicate-argument structures (TPASs) for text from one or more tax-specific documents, the method performed by one or more processors of a computing device and comprising:
receiving one or more computer-executable predicate-argument structures (PASs) generated from the text from the one or more tax-specific documents;
deserializing the one or more PASs;
categorizing the content of the one or more deserialized PASs, wherein categorizing the content of the one or more deserialized PASs includes defining an undefined term in the one or more deserialized PASs based on a defined reference for the undefined term in a label mapping; and
converting the one or more deserialized PASs to one or more TPASs.

2. The method of claim 1, further comprising generating the label mapping before deserializing the one or more PASs, wherein generating the label mapping includes indicating one or more references in the label mapping as defined references.

3. The method of claim 2, further comprising identifying which labels in the label mapping are ignored labels.

4. The method of claim 1, wherein converting the one or more PASs to one or more TPASs includes one or more of:
reordering one or more nodes of the one or more PASs based on one or more tree traversal rules;
replacing one or more nodes of the one or more PASs based on one or more tree traversal rules;
removing one or more nodes of the one or more PASs based on one or more tree traversal rules; or
combining multiple PASs for a line description based on one or more tree traversal rules.

5. The method of claim 1, wherein converting the one or more PASs to one or more TPASs includes replacing a line reference with a reference to a specific location of the line in a specific document in the one or more tax-specific documents based on a label mapping.

6. A system of generating one or more computer-executable tax-specific predicate-argument structures (TPASs) for text from one or more tax-specific documents, comprising:
one or more processors; and
a memory storing instructions that, when executed by the one or more processors, causes the system to perform operations including:
receiving one or more computer-executable predicate-argument structures (PASs) generated from the text from the one or more tax-specific documents;
deserializing the one or more PASs;
categorizing the content of the one or more deserialized PASs, wherein categorizing the content of the one or more deserialized PASs includes defining an undefined term in the one or more deserialized PASs based on a defined reference for the undefined term in a label mapping; and
converting the one or more deserialized PASs to one or more TPASs.

7. The system of claim 6, wherein converting the one or more PASs to one or more TPASs includes one or more of:
reordering one or more nodes of the one or more PASs based on one or more tree traversal rules;
replacing one or more nodes of the one or more PASs based on one or more tree traversal rules;
removing one or more nodes of the one or more PASs based on one or more tree traversal rules; or
combining multiple PASs for a line description based on one or more tree traversal rules.

8. The system of claim 6, wherein converting the one or more PASs to one or more TPASs includes replacing a line reference with a reference to a specific location of the line in a specific document in the one or more tax-specific documents based on a label mapping.

9. The system of claim 6, wherein execution of the instructions further causes the system to perform operations including generating the label mapping before deserializing the one or more PASs, wherein generating the label mapping includes indicating one or more references in the label mapping as defined references.

10. The system of claim 9, wherein execution of the instructions further causes the system to perform operations including identifying which labels in the label mapping are ignored labels.

11. A non-transitory computer-readable medium storing instructions that, when executed by one or more processors of a system to generate one or more computer-executable tax-specific predicate-argument structures (TPASs) for text from one or more tax-specific documents, cause the system to perform operations comprising:
receiving one or more computer-executable predicate-argument structures (PASs) generated from the text from the one or more tax-specific documents;
deserializing the one or more PASs;
categorizing the content of the one or more deserialized PASs, wherein categorizing the content of the one or more deserialized PASs includes defining an undefined term in the one or more deserialized PASs based on a defined reference for the undefined term in a label mapping; and
converting the one or more PAS s to one or more TPASs.

12. The computer-readable medium of claim 11, wherein converting the one or more PASs to one or more TPASs includes one or more of:
reordering one or more nodes of the one or more PASs based on one or more tree traversal rules;
replacing one or more nodes of the one or more PASs based on one or more tree traversal rules;
removing one or more nodes of the one or more PASs based on one or more tree traversal rules; or
combining multiple PASs for a line description based on one or more tree traversal rules.

13. The computer-readable medium of claim 11, wherein converting the one or more PASs to one or more TPASs includes replacing a line reference with a reference to a specific location of the line in a specific document in the one or more tax-specific documents based on a label mapping.

14. The computer-readable medium of claim 11, wherein execution of the instructions further causes the system to perform operations including generating the label mapping before deserializing the one or more PASs, wherein generating the label mapping includes indicating one or more references in the label mapping as defined references.

15. The computer-readable medium of claim 14, wherein execution of the instructions further causes the system to perform operations including identifying which labels in the label mapping are ignored labels.

* * * * *